United States Patent
Qian et al.

(10) Patent No.: US 11,653,319 B2
(45) Date of Patent: *May 16, 2023

(54) BASE STATION, TERMINAL, RANDOM ACCESS PREAMBLE DETECTION METHOD AND RANDOM ACCESS CHANNEL CONFIGURATION METHOD

(71) Applicant: Samsung Electronics Co., Ltd., Suwon-si (KR)

(72) Inventors: Chen Qian, Beijing (CN); Qi Xiong, Beijing (CN); Bin Yu, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/350,012

(22) Filed: Jun. 17, 2021

(65) Prior Publication Data

US 2022/0086774 A1    Mar. 17, 2022

Related U.S. Application Data

(63) Continuation of application No. 16/611,105, filed as application No. PCT/KR2018/005219 on May 4, 2018, now Pat. No. 11,051,262.

(30) Foreign Application Priority Data

May 5, 2017    (CN) .......................... 201710313203.X
Aug. 10, 2017    (CN) .......................... 201710682050.6
(Continued)

(51) Int. Cl.
*H04W 56/00*    (2009.01)
*H04W 72/04*    (2009.01)
(Continued)

(52) U.S. Cl.
CPC ....... *H04W 56/001* (2013.01); *H04W 72/046* (2013.01); *H04W 72/0446* (2013.01); *H04W 72/0453* (2013.01); *H04W 74/0833* (2013.01)

(58) Field of Classification Search
None
See application file for complete search history.

(56) References Cited

U.S. PATENT DOCUMENTS 8,619,682 B2    12/2013    Park et al.
10,542,562 B2    1/2020    Amuru et al.
(Continued)

FOREIGN PATENT DOCUMENTS

CN    101198152 A    6/2008
CN    102857467 A    1/2013
(Continued)

OTHER PUBLICATIONS

China National Intellectual Property Administration, "Notification of Granting of Patent Right to Invention" dated Mar. 2, 2022, in connection with Chinese Patent Application No. 201810027605.8, 8 pages.

(Continued)

*Primary Examiner* — Xavier S Wong

(57) ABSTRACT

The present disclosure relates to a communication method and system for converging a $5^{th}$-Generation (5G) communication system for supporting higher data rates beyond a $4^{th}$-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services.

(Continued)

Disclosed are a base station and a random access preamble sequence detection method thereof, and a terminal and a random access channel configuration method thereof.

12 Claims, 18 Drawing Sheets

(30) Foreign Application Priority Data

Aug. 23, 2017 (CN) .......................... 201710730237.9
Nov. 16, 2017 (CN) .......................... 201711138408.5
Jan. 11, 2018 (CN) .......................... 201810027605.8

(51) Int. Cl.
  *H04W 74/08* (2009.01)
  *H04W 72/0446* (2023.01)
  *H04W 72/0453* (2023.01)
  *H04W 72/044* (2023.01)

(56) References Cited

U.S. PATENT DOCUMENTS

| | | | |
|---|---|---|---|
| 11,051,262 B2* | 6/2021 | Qian | ................ H04W 72/0446 |
| 2007/0230600 A1 | 10/2007 | Bertrand et al. | |
| 2015/0365977 A1 | 12/2015 | Tabet et al. | |
| 2016/0021681 A1 | 1/2016 | Nan et al. | |
| 2016/0150541 A1 | 5/2016 | Park et al. | |
| 2016/0277225 A1 | 9/2016 | Frenne et al. | |
| 2016/0323915 A1 | 11/2016 | Liu et al. | |
| 2016/0330768 A1 | 11/2016 | Hu et al. | |
| 2016/0345351 A1* | 11/2016 | Bhattacharjee | ....... H04W 48/18 |
| 2017/0094624 A1 | 3/2017 | Balachandran et al. | |
| 2017/0331577 A1* | 11/2017 | Parkvall | .................. H04W 4/00 |
| 2018/0192384 A1* | 7/2018 | Chou | .................... H04W 24/10 |
| 2018/0241526 A1 | 8/2018 | Chendamarai Kannan et al. | |
| 2019/0132066 A1 | 5/2019 | Park et al. | |
| 2019/0150190 A1 | 5/2019 | Kim et al. | |
| 2019/0274172 A1* | 9/2019 | Yoon | ................ H04W 74/0833 |
| 2020/0329466 A1* | 10/2020 | Yoo | ..................... H04W 74/008 |

FOREIGN PATENT DOCUMENTS

| | | | |
|---|---|---|---|
| WO | 2016137948 A1 | 9/2016 | |
| WO | 2016203290 A1 | 12/2016 | |

OTHER PUBLICATIONS

ISA/KR, International Search Report and Written Opinion of the International Searching Authority, International Application No. PCT/KR2018/005219, dated Aug. 17, 2018, 10 pages.
ETSI TS 136 523-1 V8.0.1 (Jan. 2009), Technical Specification, LTE; Evolved Universal Terrestrial Radio Access (E-UTRA) and Evolved Universal Terrestrial Radio Access Network (E-UTRAN); User Equipment (UE) conformance specification; Part 1: Protocol conformance specification (3GPP TS 36.523.1 version 8.0.1 Release 8), Jan. 2009, 513 pages.
Supplementary European Search Report in connection with European Application No. 18794155.4 dated Apr. 6, 2020, 10 pages.
Huawei, et al., "NB-PRACH design," R1-161357, 3GPP TSG RAN WG1 Meeting #84, St. Julian's, Malta, Feb. 15-19, 2016, 8 pages.
Huawei, et al., "RACH Procedures and Resource Configuration," R1-1701724, 3GPP TSG RAN WG1 Meeting #88, Athens, Greece, Feb. 13-17, 2017, 7 pages.
Nokia, et al., "NR Physical Random Access Channel," R1-174942, 3GPP TSG-RAN WG1 #88bis, Spokane, USA, Apr. 3-7, 2017, 47 pages.
Nokia, et al., "NR Random Access Procedure," R1-1704943, 3GPP TSG-RAN WG1 #88bus, Spokane, USA, Apr. 3-7, 2017, 11 pages.
Office Action in connection with Korean Application No. 10-2019-7032514 dated Aug. 21, 2020, 9 pages.
Communication pursuant to Article 94(3) EPC dated Feb. 1, 2021 in connection with European Application No. 18794155.4, 8 pages.
NTT Docomo, Inc., "Discussion on 4-step random access procedure for NR," R1-1705712, 3GPP TSG RAN WG1 Meeting #88bis, Spokane, USA, Apr. 3-7, 2017, 8 pages.
Nokia, et al., "RACH in Multibeam System," R2-1703553, 3GPP TSG RAN WG2 #97bis, Spokane, USA, Apr. 3-7, 2017, 8 pages.
Zte, et al., "Consideration on the RACH procedure," R2-1702840, 3GPP TSG RAN WG2 #97bis, Spokane, USA, Jan. 3-7, 2017, 11 pages.
China National Intellectual Property Administration (CNIPA), "The First Office Action" dated Sep. 9, 2021, in connection with counterpart Chinese Patent Application No. 201810027605.8, 17 pages.
European Patent Office, "European Search Report," dated Apr. 4, 2023, in connection with European Patent Application No. 23151307.8, 7 pages.
Intellectual Property India, "Examination Report under sections 12&13 of the Patents Act," dated Mar. 15, 2023, in connection with Indian Patent Application No. 201937044540, 5 pages.

\* cited by examiner availabel unit for random access occasion unavailable unit

BASE STATION, TERMINAL, RANDOM ACCESS PREAMBLE DETECTION METHOD AND RANDOM ACCESS CHANNEL CONFIGURATION METHOD

CROSS-REFERENCE TO RELATED APPLICATIONS

This application is continuation of application Ser. No. 16/611,105, which is the 371 National Stage of International Application No. PCT/KR2018/005219, filed May 4, 2018, which claims priority to Chinese Patent Application No. 201710313203.X, filed May 5, 2017, Chinese Patent Application No. 201710682050.6, filed Aug. 10, 2017, Chinese Patent Application No. 201710730237.9, filed Aug. 23, 2017, Chinese Patent Application No. 201711138408.5, filed Nov. 16, 2017, and Chinese Patent Application No. 201810027605.8, filed Jan. 11, 2018, the disclosures of which are herein incorporated by reference in their entirety.

BACKGROUND

1. Field

The present disclosure relates to a configuration manner of a random access channel in a field of wireless communication technique, particularly to a base station and a random access preamble sequence detection method thereof, and a terminal and a random access channel configuration method thereof.

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology" "wired/wireless communication and network infrastructure" "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

With a rapid development of information industry, especially increasing demands from a Mobile Internet and an Internet of Things (IoT), it brings unprecedented challenges to future mobile communication technologies. According to a report ITU-R M. [IMT.BEYOND 2020.TRAFFIC] from the International Telecommunication Union (ITU), it could be expected that a growth of mobile traffic will increase nearly 1000 times that of 2010 (4G era) by 2020, and a number of user equipment connections would be more than 17 billion. With massive IoT devices gradually penetrate the mobile communication network, the number of connected devices will be even more amazing. In response to this unprecedented challenge, a communications industry and an academia have embarked on a wide research for the fifth generation mobile communications technology (5G) to face the 2020s. Currently, a framework and an overall goal of the future 5G has been discussed in the ITU's report ITU-R M. [IMT.VISION], wherein a demand outlook, application scenarios and key performance indicators of the 5G were described in detail. For the new requirements in 5G, the ITU's Report ITU-R M. [IMT.FUTURE TECHNOLOGY TRENDS] provides information on technology trends for the 5G to address issues such as significant improvements in system throughput, user experience consistency, scalability, etc., in order to support IoT, latency, energy efficiency, cost, network flexibility, emerging services and flexible spectrum utilization and the like.

A random access process is an important way for a terminal in a system to establish a connection with a base station. In LTE, a preamble sequence needs to be transmitted in a Physical Random Access Channel (PRACH) regardless of whether it is a contention-based random access procedure. The PRACH is configured and indicated through PRACH configuration information. Specifically, the PRACH configuration is defined by means of a look-up table, including contents such as a preamble sequence format corresponding to the PRACH, available subframes, time domain density and frequency domain mapping information, etc.

In LTE, the contents in the PRACH configuration information are different for different frame structures (a FDD frequency division duplexing or a TDD time division duplexing). For the FDD, the PRACH configuration includes the preamble sequence format and available subframe indices; for TDD, the PRACH configuration includes the preamble sequence format, a time domain PRACH density, and a version index. Meanwhile, for the TDD frame structure, a protocol defines each PRACH configuration index and a PRACH time domain-frequency domain resource mapping manner corresponding to an uplink/downlink configuration. The PRACH configuration modes in the LTE are given in the form of a look-up table. The terminal reads the PRACH configuration information from a Master Information Block (MIB) in a physical broadcast channel or a System Information Block (SIB) indicated by the MIB to obtain a PRACH time-frequency resource.

SUMMARY

A PRACH structure in the LTE is relatively simple, and the terminal can know the position of the time-frequency resource of the PRACH directly through the PRACH configuration information. In a 5G high-band systems, a multi-beam operation is required to compensate for a large path loss in the high-band channel by a beamforming gain. For the random access procedure under the multi-beam operation, a corresponding PRACH configuration (that is, the random access channel configuration) is needed to be determined for each beam. If the PRACH configuration information mode in the LTE is still adopted, a signaling overhead required would be significantly increased, which will reduce an operating efficiency of the system. Therefore, for the PRACH configuration mode in a 5G system (that is, a random access channel configuration corresponding to the PRACH configuration mode in the LTE), there is needed a new mode to improve the system operation efficiency.

In 5G, a problem solved by the present invention is heavy signaling overheads caused by a random access channel configuration manner being similar to a PRACH configuration in LTE, which would be not helpful to improve efficiency of a system. For a multi-beam operation system being possible in 5G, it is needed to optimize the random access channel configuration manner similar to the PRACH configuration in LTD and configuration contents, but no documents or solutions are disclosed to settle such problem currently.

According to an aspect of the present disclosure, there is provided a random access channel configuration method comprising steps of: determining, by a terminal, optimal synchronization signal blocks according to a downlink measurement result; acquiring, by the terminal, an index of the random access channel configuration and information on a preamble sequence resource pool based on the optimal synchronization signal blocks; determining, by the terminal, a time-frequency resource of corresponding random access occasion according to an association between the synchronization signal blocks and the random access channel resources and/or the acquired random access channel configuration index; selecting, by the terminal, preamble sequences from the preamble sequence resource pool; and transmitting the selected preamble sequences at the determined time-frequency resource for the random access occasion, wherein the index of the random access channel configuration includes an index of a physical random access channel configuration, and the index of the physical random access channel configuration comprises: a random access preamble format, a time-frequency information of the random access channel, a number of the random access occasions included in the random access channel and a number of the random access occasions included in the random access channel in a time domain, or the index of the physical random access channel configuration further comprises at least one of a number of the synchronization signal block associated with a same random access occasion, available time units of the random access occasion, a number of the random access channels within a unit time unit in the time domain, a number of the random access occasions included in the random access channel in a frequency domain.

In an example, the association between the synchronization signal blocks and the random access channel resources comprises a one-to-one mapping relationship existed between the synchronization signal blocks and the random access occasions, wherein a random access channel configuration information is carried on a Master Information Block (MIB) on a broadcast signal in the synchronization signal block or on a system information block indicated by the MIB, and the random access channel configuration information indicated by the different synchronization signal blocks is same.

In an example, determining, by the terminal, a time-frequency resource of corresponding random access occasion comprises: when the random access occasions in the random access channel are arranged continuously in both of the time domain and the frequency domain, and the association are made in a time domain first criterion, numbers of the random access occasions in the random access channel in the time domain and the frequency domain determined by the terminal based on the random access channel configuration information are $M_{RO}$ and $N_{RO}$ respectively, the number of the random access occasions in the random access channel is $M_{RO}N_{RO}$, the number of the synchronization signal blocks is $N_{SS}=M_{RO}N_{RO}$, and the index of the synchronization signal block selected by the terminal based on the measurement result is $n_{SS}$, an index range is $0 \sim N_{SS}-1$, then an index of the random access occasion in the time domain selected by the terminal is:

$$m_{RO}=\mathrm{mod}(n_{SS},M_{RO}),$$

and an index of the random access occasion in the frequency domain selected by the terminal is:

$$n_{RO}=\lfloor n_{SS}/M_{RO}\rfloor,$$

wherein the operation mod(·) denotes a Modulo operation, and the operation $\lfloor \cdot \rfloor$ denotes a Floor operation.

In an example, determining, by the terminal, a time-frequency resource of corresponding random access occasion comprises: the terminal determines a preamble sequence format according to the random access channel configuration, and obtains a number of time units, $t_{msg1}$, occupied by the entire preamble sequences and a bandwidth of the random access occasion, $w_{msg1}$, expressed by a number of physical resource blocks, wherein a start position of the random access occasion in the time domain is $(t+t_{msg1}m_{RO})$th time unit, wherein parameter t is a position information of the time-frequency resource carried by the random access channel configuration; wherein a start position of the random access occasion in the frequency domain is $(n+w_{msg1}n_{RO})$ th physical resource block, wherein parameter n is a position information of the time-frequency resource carried by the random access channel configuration.

In an example, determining, by the terminal, a time-frequency resource of corresponding random access occasion comprises: when the respective random access occasions in the random access channel are arranged at an equal interval and mapped and associated in the time domain first criterion, a start position of the random access occasion associated with the synchronization signal block $n_{SS}$ in the time domain is the $(t+(t_{msg1}+k)m_{RO})$th time unit if the two random access occasions adjacent to each other in the time domain are spaced by k time units; and a start position of the random access occasion associated with the synchronization signal block $n_{SS}$ in the frequency domain is the $(n+(w_{msg1}+s)n_{RO})$th time unit if the two random access occasions adjacent to each other in the frequency domain are spaced by s physical resource blocks.

In an example, determining, by the terminal, a time-frequency resource of corresponding random access occasion comprises: when the respective random access occasions in the random access channel are arranged at an equal interval and mapped and associated in a frequency domain first criterion, if the index of the synchronization signal block selected by the terminal according to the measure result is $n_{SS}$ and the index range is $0 \sim N_{SS}-1$, the index of the random access occasion in the time domain selected by the terminal is:

$$m_{RO}=\mathrm{mod}(n_{SS},N_{RO}),$$

the index of the random access occasion in the frequency domain selected by the terminal is:

$$n_{RO}=\lfloor n_{SS}/N_{RO} \rfloor,$$

wherein $N_{RO}$ is a number of the random access occasions in the frequency domain.

Wherein the indices of the random access occasions arranged continuously in the random access channel satisfy the time domain first, or follow the frequency domain first criterion; alternatively, wherein the indices of the random access occasions arranged at the equal interval in the random access channel satisfy the time domain first, or follow the frequency domain first criterion. Wherein the indices satisfying the time domain first criterion are the indices of which the random access occasions are continuous in a same frequency domain resource; and the indices satisfying the frequency domain first criterion are the indices of which the random access occasions are continuous in a same time domain resource.

In an example, determining, by the terminal, a time-frequency resource of corresponding random access occasion comprises: the random access occasions are mapped on all of available uplink time units.

In an example, determining, by the terminal, a time-frequency resource of corresponding random access occasion comprises: if one random access occasion occupies $k_m$ time units, the one random access occasion is associated to $k_m$ associated adjacent uplink time units, but the uplink time units which are adjacent to the downlink time units and may not be associated with other uplink time units are excluded without association.

In an example, determining, by the terminal, a time-frequency resource of corresponding random access occasion comprises: if one random access occasion occupies the $k_m$ time units, the one random access occasion is associated to the $k_m$ associated adjacent uplink time units.

In an example, determining, by the terminal, a time-frequency resource of corresponding random access occasion comprises: the terminal determines a time and a frequency positions according to information on available time units of the random access occasions in the random access channels configuration information.

In an example, determining, by the terminal, a time-frequency resource of corresponding random access occasion comprises: if the available time unit exhausts while the mapping of the random access occasions has not completed yet, the mapping of the random access occasions is made with an adjacent frequency band and same available time units.

In an example, the random access occasions in the different time units use different frequency resources.

In an example, the association between the synchronization signal blocks and the random access channel resources comprises a mapping relationship between a plurality of synchronization signal blocks and one random access occasion, wherein a random access channel configuration information is carried on a Master Information Block (MIB) on a broadcast signal in the synchronization signal block or on a system information block indicated by the MIB, and the random access channel configuration information indicated by the different synchronization signal blocks is same.

In an example, determining, by the terminal, a time-frequency resource of corresponding random access occasion comprises: if the number of the synchronization signal blocks associated with a same random access occasion is S and the random access occasions are assigned in the time domain first criterion, the index of the synchronization signal block starts from 0, and the number of available random access occasions in the time domain is $M_{RO}$, the time domain index of the random access occasion associated with the synchronization signal block $n_{SS}$ is calculated as:

$$m_{RO}=\mathrm{mod}(\lfloor n_{SS}/S \rfloor,M_{RO}),$$

and the frequency domain index of the random access occasion associated with the synchronization signal block $n_{SS}$ is calculated as:

$$n_{RO}=\lfloor \lfloor n_{SS}/S \rfloor/M_{RO} \rfloor,$$

Wherein the terminal determines the time-frequency position of the random access occasion according to method of any one described above, after it obtains the time domain index or frequency domain index of the random access occasion in the random access channel.

In an example, determining, by the terminal, a time-frequency resource of corresponding random access occasion comprises: if the number of the synchronization signal blocks associated with a same random access occasion is S and the random access occasions are assigned in the frequency domain first criterion, the index of the synchronization signal block starts from 0, and the number of available random access occasions in the frequency domain is $N_{RO}$, the time domain index of the random access occasion associated with the synchronization signal block $n_{SS}$ is calculated as:

$$m_{RO}=\mathrm{mod}(\lfloor n_{SS}/S \rfloor,N_{RO}),$$

and the frequency domain index of the random access occasion associated with the synchronization signal block $n_{SS}$ is calculated as:

$$n_{RO}=\lfloor \lfloor n_{SS}/S \rfloor/N_{RO} \rfloor,$$

Wherein the terminal determines the time-frequency position of the random access occasion according to method described above, after it obtains the time domain index or frequency domain index of the random access occasion in the random access channel.

In an example, determining, by the terminal, a time-frequency resource of corresponding random access occasion comprises: the terminal further determines the time-frequency position of the random access occasion according to the method described above, based on the number information of the synchronization signal blocks associated with the same random access occasion in the random access channel configuration information.

In an example, when the random access channel configuration information carried on the master information block on the broadcast signal in the respective synchronization signal blocks or carried on the system information block indicated by the master information block is same, the synchronization signal block carries a offset for the time-frequency resource of the random access occasion associated with the synchronization signal block with respect to a time-frequency position information provided in the random access channel configuration, wherein when the random access channel configuration information carried on the master information block on the broadcast signal in the respective synchronization signal blocks or carried on the system information block indicated by the master information block is different, the time-frequency resource information in the random access channel configuration directly represents the time-frequency resource information of the random access occasion associated with the synchronization signal block.

In the example, determining, by the terminal, a time-frequency resource of corresponding random access occasion comprises: if the time-frequency resource information provided in the random access channel configuration information is (t, n) while the offset information carried in the synchronization signal block $n_{SS}$ is $t_{SS}$ and $n_{SS}$, the time domain position of the random access occasion associated with the synchronization signal block $n_{SS}$ is $t+t_{SS}$ and the frequency domain position is $n+n_{SS}$.

According to another aspect of the present disclosure, there is provided a random access preamble sequence detection method of a base station comprising steps of: transmitting synchronization signal blocks including a primary synchronization signal, a secondary synchronization signal and a broadcast channel; detecting respective random access occasions in a random access channel; determining downlink transmitting beams for transmitting a random access response according to time frequency resources of the random access occasions and/or the detected random access preamble sequences, if the transmission of the preamble sequences is detected; transmitting the random access response by using the determined downlink transmitting beams, wherein the detected preamble sequences are transmitted on the time frequency resources of the random access occasions determined by the terminal based on the method described above.

According to a further aspect of the present disclosure, there is provided an apparatus for acquiring and determining time frequency resources of a random access channel in a terminal, and the apparatus comprises: a downlink measurement module configured to determine synchronization signal blocks based on a downlink measure result; a configuration information acquisition module configured to read random access channel configuration information from the synchronization signal blocks; a random access occasion time frequency resource determination module configured to determine a time frequency resource position of the random access occasion according to the random access channel configuration and association information and so on; a preamble sequence transmitting module configured to transmit the preamble sequence on the random access occasion, wherein the random access occasion time frequency resource determination module determines the time frequency resource position of the random access occasion based on the method described above.

According to a still further aspect of the present disclosure, there is provided a preamble sequence detection apparatus of a base station, which comprises: a synchronization signal block transmitting module configured to transmit the synchronization signal blocks; a preamble sequence detection module configured to detect the preamble sequences on the respective random access occasions of the random access channel; a downlink beam determination module configured to determine downlink beams according to the time frequency resources of the random access occasions and the preamble sequences; a random access response transmitting module configured to transmit a random access response using the determined downlink beams, wherein the preamble sequences detected in the preamble sequence detection module are transmitted on the time frequency resources of the random access occasion determined based on the method described above.

The present disclosure provides an acquisition and determination manner of time-frequency resource of the random access channel in a multi-beam operation system. With the methods provided by the present disclosure, the system can configure the time-frequency resources of the random access occasions corresponding to the different beams in a smaller signaling overhead. Further, the terminal can acquire the information on the random access occasion more quickly, so that the entire performance and operation efficiency of the system are improved.

BRIEF DESCRIPTION OF THE DRAWINGS

The present disclosure will become more fully understood from the detailed description given hereinafter and the accompanying drawings which are given by way of illustration only, and thus are not limitative of the present disclosure and wherein.

DETAILED DESCRIPTION

Thereafter, the present disclosure would be explained in connection with drawings in details.

For the issue of random access channel configuration under the multi-beam operation in 5G, the present disclosure provides a random access channel configuration manner. Particularly, by referring FIG. 1, FIG. 1 is a flowchart illustrating a method for determining time frequency resources of a random access channel according to the present disclosure.

Figure 1:
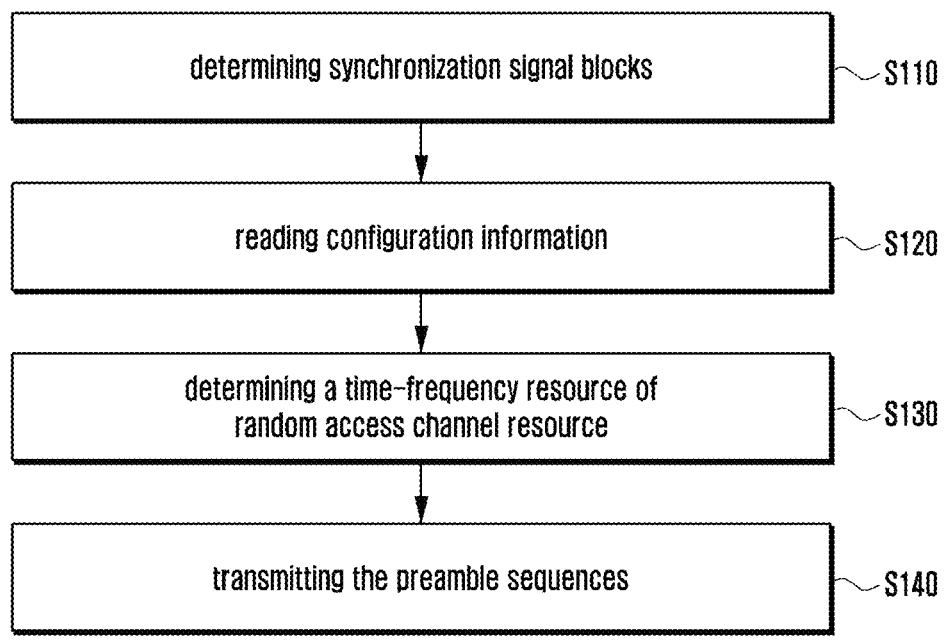
FIG. 1 is a flowchart illustrating a method for determining by a terminal time frequency resources of a random access channel according to the present disclosure.

In FIG. 1, at step S110, the terminal determines optimal synchronization signal blocks according to a downlink measurement result. At step 120, the terminal reads an index of the optimal synchronization signal block, and reads an index of the random access channel configuration therein and information on a preamble sequence resource pool from a Master Information Block (MIB) in a broadcast channel therein or from a System Information Block (SIB) indicated by the MIB. At step S130, the terminal determines a time-frequency resource of corresponding random access channel according to an association between the synchronization signal blocks and the random access channel resources, which is predefined or informed in the MIB or SIB, and the information on the read random access channel configuration index. At step S140, the terminal selects preamble sequences from the preamble sequence resource pool, and transmits the selected preamble sequences at the random access channel time frequency resource determined in step S140.

As compared with the prior art, the solution proposed by the present disclosure can notice the random access channel time frequency resource with less signaling, which saves the signaling overheads and improves an efficiency and a performance of the system indication.

First Embodiment

In the present embodiment, an indication manner of a physical random access channel configuration information would be discussed in connection with a detailed system. In the present embodiment, the system operates in a high frequency band, and copes with a notable path loss in the high frequency band through a beam forming gain by utilizing a multi-beam operation and beam forming, etc. In order to synchronize a plurality of downlink beams, a synchronization channel of the system is consisting of a plurality of synchronization signal blocks (SS blocks), each of the synchronization signal blocks includes a Primary Synchronization Signal (PSS), a Secondary Synchronization Signal block (SSS) and a physical broadcast channel. The different synchronization signal blocks are transmitted by same or different downlink transmitting beams. In the present embodiment, it is assumed that the different synchronization signal blocks are transmitted by the different downlink transmitting beams.

To facilitate the base station to determine the preferred transmitting beam, an association is established between the synchronization signal blocks and the physical random access channel. In the present embodiment, it is assumed that the association is preset, that is to say, the association is known commonly by both the base station and the terminal, and the terminal may determine the corresponding random access channel time frequency resources according to the physical random access channel configuration information and corresponding indication information.

Figure 2:
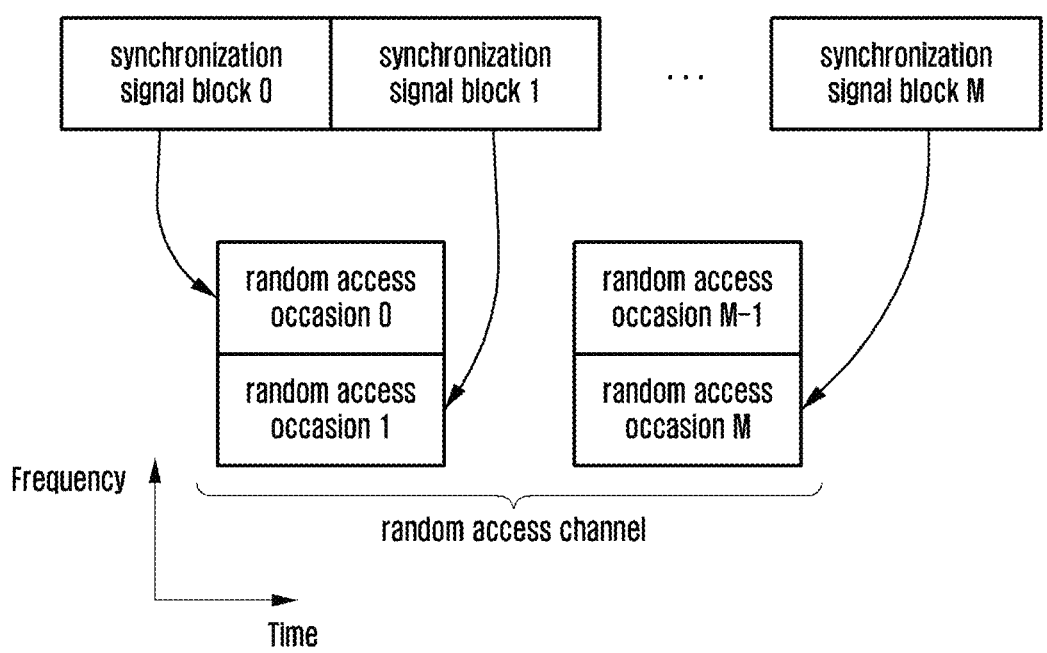
FIG. 2 is an exemplary view illustrating an association between synchronization signal blocks and random access occasion according to a first embodiment of the present disclosure, wherein a one-to-one mapping relationship exists between the synchronization signal blocks and the random access occasions.

In the present embodiment, it is assumed that the random access channel is consist of a plurality of random access occasions, and one random access occasion is configured to transmit a preamble sequence defined in a format of random access preamble sequence. Meanwhile, as the association between the synchronization signal blocks and the physical random access channels, a mapping relationship is established between one synchronization signal block and one random access occasion, as illustrated in FIG. 2. FIG. 2 is an exemplary view illustrating an association between synchronization signal blocks and random access occasions according to the first embodiment of the present disclosure, wherein a one-to-one mapping relationship exists between the synchronization signal blocks and the random access occasions.

It should be noted that a case where an association is established between the plurality of synchronization signal blocks and one same random access occasion would be discussed later in connection with the second embodiment illustrated in FIG. 9.

In the first embodiment, as same as illustrated in FIG. 1, the terminal determines the optimal synchronization signal block according to the downlink measurement result when it tries to access. The measurement result comprises a Reference Signal Received Power (RSRP) of the PSS and/or a RSRP of the SSS. The terminal selects one or more synchronization signal blocks with an optimal measurement result (for example, with the maximum RSRP), and read information therein. If multiple synchronization signal blocks are selected, the terminal selects the synchronization signal blocks whose measurement results is greater than a certain preset threshold. When the information is read from the synchronization signal block, a preset rule is followed, for example, the information in the synchronization signal block with the maximum RSRP is read, or the information in the multiple synchronization signal blocks is read at an equal probability. It should be noted that reading of the information from the synchronization signal block refers to determination of an index of this synchronization signal block from the selected synchronization signal blocks, reading of a Master Information Block (MIB) in its broadcast channel and corresponding Remaining Minimum System Information (RMSI) indicated by the MIB. It should be understood that reading of the information from the multiple synchronization signal blocks at the equal probability refers to select one synchronization signal block from the multiple synchronization signal blocks with a value being greater than the preset threshold at the equal probability and read the information therein.

The process and criterion for determining the synchronization signal block described above and the manner for determining the random access channel configuration are also applicable to an random access retry process as the random access process fails. In particular, if the random access process fails, the terminal determines the utilized time frequency resources for the random access occasion according to the latest measurement result of the downlink signal when it makes a power climbing and initiates a random access retry process. If the selection criterion of the downlink signal indicates to select the synchronization signal block with the maximum RSRP, the terminal still selects the synchronization signal block with the maximum RSRP and selects the random access occasion associated with it to perform the random access retry process when the random access retry process is initiated. If the selection criterion of the downlink signal indicates to select one synchronization signal block from the multiple synchronization signal blocks with the value being greater than the preset threshold at the equal probability, the terminal confirms whether the RSRP of the synchronization signal block associated with the current random access occasion is still greater than the threshold when it initiates the random access retry process at first, if yes, the terminal performs the random access retry process using the time frequency resources of the current random access occasion. If not, the terminal selects a plurality of synchronization signal blocks with values being greater than the preset threshold from the latest measurement result, selects one synchronization signal block at the equal probability therefrom, determines the random access occasion according to the association, and initiates the random access retry process.

The terminal read information from the above determined optimal synchronization signal blocks. Particularly, the index of the synchronization signal block is determined through the PSS, SSS and/or the MIB in the broadcast channel; the random access channel configuration information is read from the MIB in the broadcast channel, or the SIB indicated by the MIB, and the random access preamble sequence pool information is read; and other information necessary for assessing is read.

The terminal determines the time-frequency resource of the random access channel according to the read random access channel configuration information and the preset association between the synchronization signal blocks and the random access channel resources. The terminal selects the preamble sequence from the preamble sequence resource pool, and transmits the selected preamble sequence on the determined time frequency resource position of the random access channel.

In an example, when the terminal determines the time-frequency resource of the random access channel according to the read random access channel configuration information and the preset association between the synchronization signal blocks and the random access channel resources, one possible manner for determining the random access channel time frequency resource is as follows.

At first, for the read random access channel configuration information, the random access channel configuration information comprises an index of the physical random access channel configuration. The index of the physical random access channel configuration indicates: a random access preamble sequence format, a time-frequency resource information of the random access channel, a number of the random access channels in a unit time unit in the time domain, a number of the random access occasions included in the random access channel and a number of the random access occasions included the random access channel in a time domain. The index of the random access channel configuration is in a form of index table, both the base station and the terminal save the index table, and the terminal knows the random access channel configuration through the index of the random access channel configuration. An example of the above random access channel configuration may be given by Table 1.

The information of the random access channel configuration further comprises other information about the time frequency resource position of the random access occasion.

TABLE 1 example of index table of random access channel configuration

| Index | Preamble Sequence Format | Density of Random Access Channel | Number of Random Access Occasions | Number Of Random Access Occasions In Time Domain | Time Frequency Resource Information |
|---|---|---|---|---|---|
| 0 | 0 | 0.5 | 8 | 4 | $(t_0, n_0)$ |
| 1 | 0 | 1 | 16 | 8 | $(t_1, n_1)$ |
| 2 | 1 | 1 | 8 | 8 | $(t_2, n_2)$ |
| 3 | 1 | 2 | 16 | 8 | $(t_3, n_3)$ |
| ... | ... | ... | ... | ... | ... |

It should be noted that the time unit described previously may be represented by an absolute time, for example, a number of the random access channels within 1 ms; or may be represented by a radio frame, a subframe or a slot, for example, a number of the random access channels within the radio frame. The density of the random access channel in Table 1 indicates same contents as the number of the random access channels within the unit time unit. Wherein 0.5 indicates one random access channel per two time units, 1 indicates one random access channel per time unit, and 2 indicates two random access channels per time units. The time frequency resource information shown in Table 1 is given in a form of combination of the time index and the frequency index, wherein the time index may be represented by an index of the unit time, for example, a subframe index, a slot index or a symbol index; and the frequency index may be represented by an index of a physical resource block.

In other representations for other configuration manners of the random access channel configuration information, the time frequency resource may be divided and represented respectively, for example, the time frequency resource information may be deleted from the Table and contents about a time domain index and a frequency domain index may be added, wherein the time domain index is represented by the index of the unit time, for example, the subframe index, the slot index or the symbol index; and the frequency index may be represented by the index of the physical resource block. In the way, the time domain index may also give a time index available in the unit time, for example, the subframe index possible existing for the random access channel in the radio frame, or the slot index or symbol index possible existing for the random access channel in the subframe, or the symbol index possible existing for the random access channel in the slot. In other configuration manner, the time frequency position information may be indicated separately, instead of being included in the index of the physical random access channel configuration.

In the above description for the configuration manner shown in Table 1, the number of the random access occasions and the number of the random access occasions in the time domain are used to determine a distribution of the respective random access occasions in the random access channel in the time domain and the frequency domain. In the above example, the distribution of the random access occasions in the random access channel in the time domain and the frequency domain may be deduced by acquiring the number of the random access occasions in the random access channel and the number of the random access occasioning the time domain. That is to say, the number of the random access occasion in the frequency domain may be obtained by dividing the number of the random access occasions by the number of the random access occasions in the time domain.

In other configuration manners for the random access channel configuration information, the number of the random access occasions in the time domain and the number of the random access occasions in the frequency domain may be indicated, instead of the number of the random access occasions and the number of the random access occasions in the time domain; alternatively, the number of the random access occasions and the number of the random access occasions in the frequency domain may be indicated, then the terminal may obtain the number of the random access occasions in the time domain via calculation.

It should be noted that the random access channel configuration information carried in the MIBs on the broadcast signals in the respective synchronization signal blocks or in the SIBs indicated by the MIBs are same. Wherein the time-frequency resource information is the time-frequency resource of the first random access occasion in the random access channel. The first random access occasion represents a random access occasion with a minimum time index and a minimum frequency index.

Further, in the configuration in the Table 1, a density of the random access channels or a number of the random access channels in a unit time unit is used to denote a number of available random access channels in the unit time unit in time domain. Similarly, several available random access channels may also exist in frequency domain, and may be acquired by adding corresponding parameter(s) in the random access channel configuration information.

The terminal may determine the time-frequency position of the random access occasion corresponding to the selected synchronization signal block according to the described-above association between the synchronization signal blocks and the random access channels, which is implemented by a predetermined criterion, after acquiring the random access channel configuration information.

A possible association is, a one-to-one mapping relationship is existed between the synchronization signal blocks and the random access occasions (as illustrated in FIG. 2), that is, the different synchronization signal blocks are associated with the different time-frequency resources of the random access occasions. The predetermined criterion is a time domain first criterion or a frequency domain first criterion, the random access occasions in the random access channel are numbered and indexed; the criterion further comprises an interval among the adjacent random access occasions in the time domain and the frequency domain. Wherein, the time domain first criterion numbers the time resources first and then the frequency resources as numbering the resources, while the frequency domain first criterion numbers the frequency resources first and then the time resources as numbering the resources.

Figure 3:
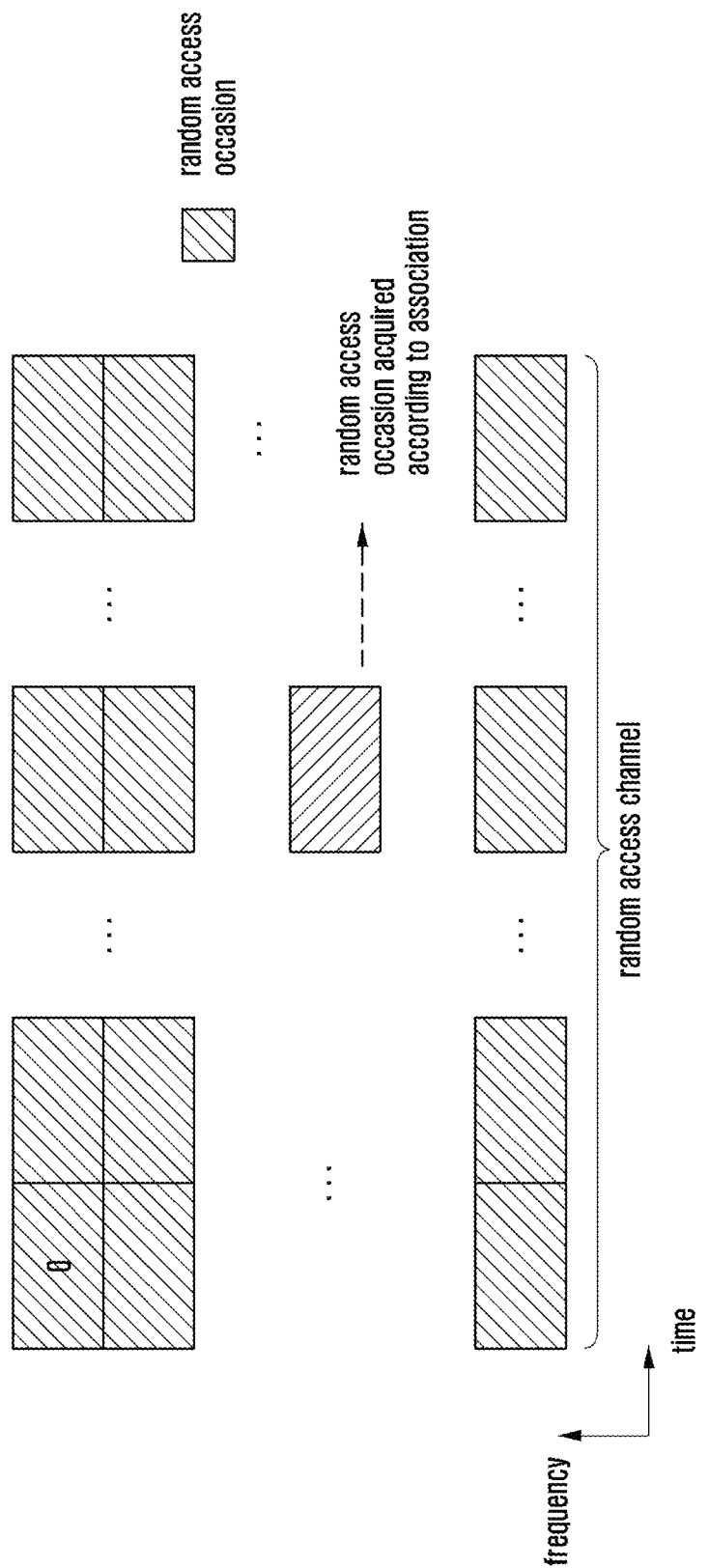
FIG. 3 is an exemplary view illustrating a determination manner of the random access occasion in the random access channel according to the first embodiment of the present disclosure.

FIG. 3 is an exemplary view illustrating a determination manner of the random access occasion in the random access channel according to the first embodiment of the present disclosure.

Particularly, below will describe a determination of, by the terminal, the time-frequency position of the random access occasion corresponding to the selected synchronization signal block.

Case 1

Assuming previously: the random access occasions in the random access channel are arranged continuously both in the time domain and the frequency domain, and are mapped and associated in the time domain first criterion. This example is applicable to a Frequency Division Multiplexing (FDM) structure, namely a case where uplink frame structures are continuous.

The terminal receives the random access channel configuration information, and determines a time-frequency resource of the random access channel (namely the time-frequency resource of the first random access occasion in the random access channel) according to the information. The numbers of the random access occasions in the random access channel in the time domain and the frequency domain determined by the terminal based on the random access channel configuration information are $M_{RO}$ and $N_{RO}$ respectively, the number of the random access occasions in the random access channel is $M_{RO}N_{RO}$, the number of the synchronization signal blocks is $N_{SS}=M_{RO}N_{RO}$ by taking the one-to-one association between the synchronization signal blocks and the random access occasions into account.

An index of the synchronization signal block selected by the terminal based on the measurement result is $n_{SS}$, an index range is $0 \sim N_{SS}-1$, then an index of the random access occasion in the time domain selected by the terminal is:

$$m_{RO} = \mathrm{mod}(n_{SS}, M_{RO}),$$

and an index of the random access occasion in the frequency domain selected by the terminal is:

$$n_{RO} = \lfloor n_{SS}/M_{RO} \rfloor,$$

wherein the operation mod( ) denotes a Modulo operation, and the operation $\lfloor \cdot \rfloor$ denotes a Floor operation. The above rule indicates that, if index of the synchronization signal block obtained by the terminal based on the measurement result is $n_{SS}$; the random access occasion associated therewith is the random access occasion which is the $m_{RO}$th in the time domain and then $n_{RO}$th in the frequency domain. That is to say, the time domain index of the random access occasion associated with the synchronization signal block with the index of $n_{SS}$ is $m_{RO}$, and the time domain index of the random access occasion associated with the synchronization signal block with the index of $n_{SS}$ is $n_{RO}$.

The terminal determines a preamble sequence format according to the random access channel configuration, and obtains a number of time units, $t_{msg1}$ occupied by the entire preamble sequences and a bandwidth of the random access occasion, $w_{msg1}$ expressed by a number of physical resource blocks. After obtaining such information, the time-frequency resource of the random access occasion may be calculated in connection with the indices of the random access occasion both in the time domain and the frequency domain. Particularly, a start position of the random access occasion in the time domain is $(t+t_{msg1}m_{RO})$th time unit, wherein parameter t is a position information of the time-frequency resource carried by the random access channel configuration; a start position of the random access occasion in the frequency domain is $(n+w_{msg1}n_{RO})$th physical resource block, wherein parameter n is a position information of the time-frequency resource carried by the random access channel configuration.

Case 2

Assuming previously: the respective random access occasions in the random access channel are distributed at an equal interval and mapped and associated in the time domain first criterion.

For example, a start position of the random access occasion associated with the synchronization signal block $n_{SS}$ in the time domain is the $(t+(t_{msg1}\pm k)m_{RO})$th time unit if the two random access occasions adjacent to each other in the time domain are spaced by k time units.

A start position of the random access occasion associated with the synchronization signal block $n_{SS}$ in the frequency domain is the $(n+(w_{msg1}+s)n_{RO})$th physical resource block if the two random access occasions adjacent to each other in the frequency domain are spaced by s physical resource blocks.

It should be noted that the above description is also applicable to the manner of associating in the frequency domain first criterion. In particular, if the index of the synchronization signal block selected by the terminal according to the measure result is $n_{SS}$ and the index range is $0 \sim N_{SS}-1$, the index of the random access occasion in the time domain selected by the terminal is:

$$m_{RO}=\mathrm{mod}(n_{SS}, N_{RO}),$$

the index of the random access occasion in the frequency domain selected by the terminal is:

$$n_{RO}=\lfloor n_{SS}/N_{RO} \rfloor,$$

wherein $N_{RO}$ is a number of the random access occasions in the frequency domain.

The Case 1 described above is more applicable to determine the time-frequency position of the random access occasion corresponding to the synchronization signal block selected by the terminal in the FDM structure (namely the case where the uplink frame structures are continuous).

As to determining the time-frequency position of the random access occasion corresponding to the synchronization signal block selected by the terminal in a Division Multiplexing (TDM) structure (namely a case where the uplink frame structures are non-continuous), the above example may be modified. Below will explain by referring to FIGS. 4, 5 and 6.

Regarding the TDM structure, the index $m_{RO}$ in time domain and the index $n_{RO}$ in frequency domain of the random access occasion associated with the index $n_{SS}$ of the synchronization signal block may be calculated following the above process. The terminal may take the preamble sequence format information included in the random access configuration, or a number of time units, k, occupied by the entire preamble sequences and a bandwidth s expressed by the number of physical resource blocks into account.

In order to determine the index in the time domain of the random access occasion in the TDM structure, an index of a start time unit among available uplink time units may be calculated according to the above process and a transmitting time position of the random access occasion may be determined according to current uplink/downlink configurations.

Figure 4:
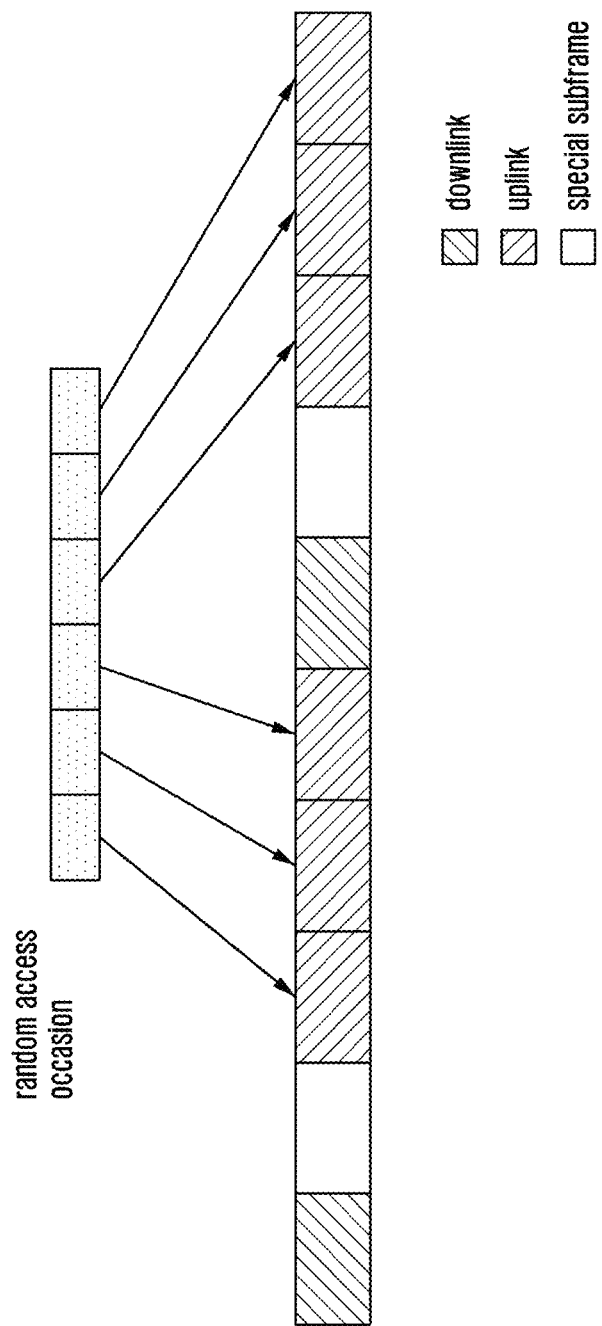
FIG. 4 is an exemplary view illustrating a transmitting position determination manner of the random access occasion in a frame structure of time division multiplexing according to the first embodiment of the present disclosure.

FIG. 4 is an exemplary view illustrating a transmitting position determination manner of the random access occasion in a frame structure of TDM according to the first embodiment of the present disclosure.

In FIG. 4, the frame structure of TDM consists of downlink subframes, uplink subframes and special subframes. Wherein the special subframes are used to conversion to a uplink transmission from a downlink transmission. In the example shown in FIG. 4, it is assumed that one random access channel occupies one subframe and is only associated to all of the available uplink subframes.

Figure 5:
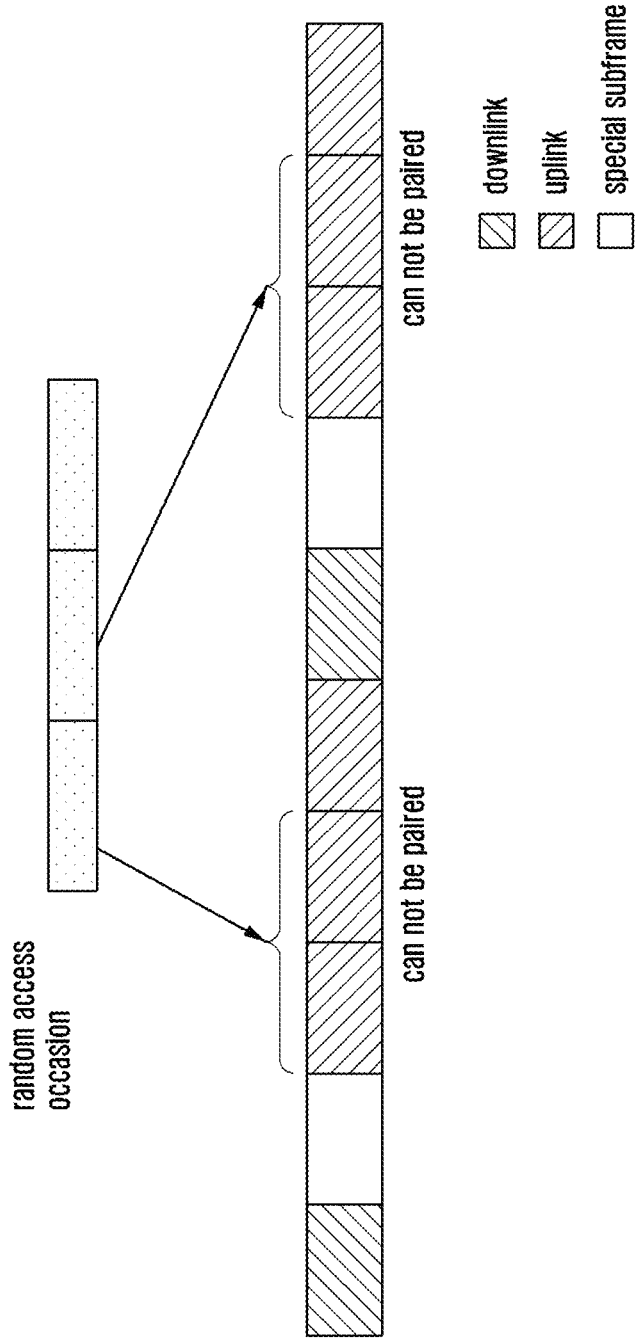
FIG. 5 is an exemplary view illustrating a transmitting position determination manner of the random access occasion in another frame structure of time division multiplexing according to the first embodiment of the present disclosure.
Figure 6:
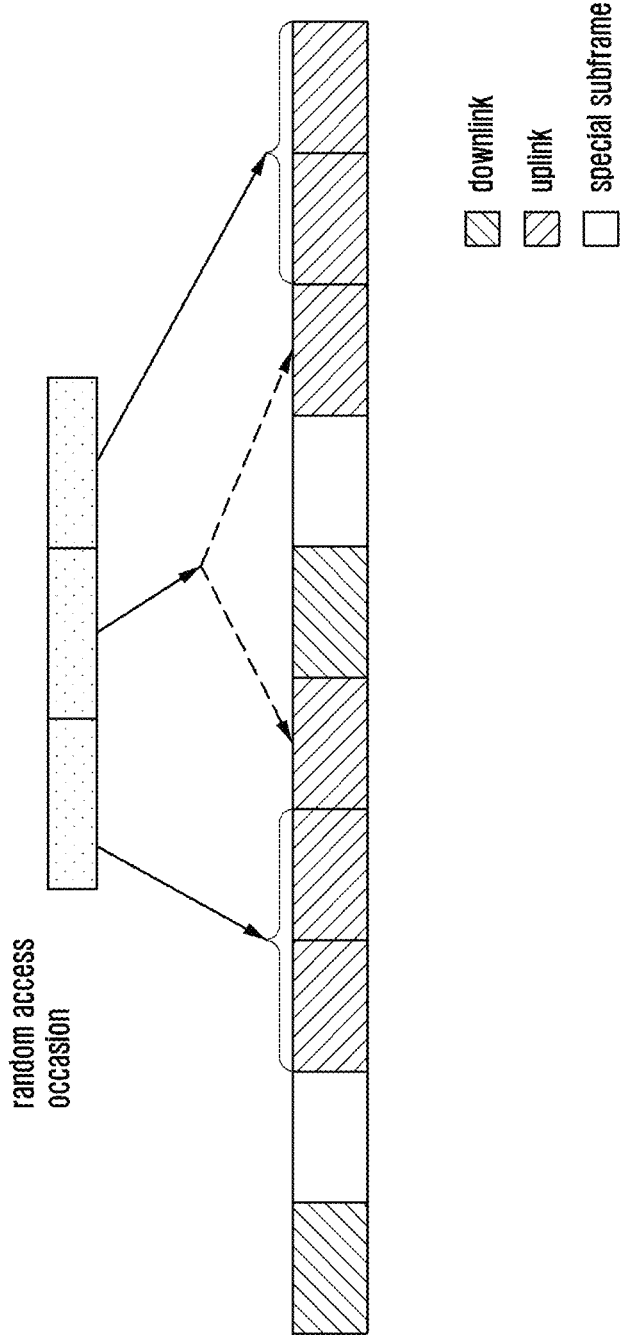
FIG. 6 is an exemplary view illustrating a transmitting position determination manner of the random access occasion in a further frame structure of time division multiplexing according to the first embodiment of the present disclosure.

FIG. 5 is an exemplary view illustrating a transmitting position determination manner of the random access occasion in another frame structure of TDM according to the first embodiment of the present disclosure; and FIG. 6 is an exemplary view illustrating a transmitting position determination manner of the random access occasion in a further frame structure of time division multiplexing according to the first embodiment of the present disclosure.

In the examples illustrated in FIGS. 5 and 6, one random access occasion may occupy a plurality of time units.

Processing of FIG. 5 will be explained as follows. if one random access occasion occupies $k_m$ time units, $k_m$ adjacent uplink time units are associated and mapped, and the uplink time units which are adjacent to the downlink time units and may not be associated with other uplink time units are excluded without association.

In the example illustrated in FIG. 5, one random access occasion needs to occupy two subframes. In all of the available uplink subframes, two subframes adjacent in the time domain are associated and paired to transmit one random access occasion. A subframe 4 and a subframe 9 (the index range is 0~9) cannot be paired because their adjacent subframes are downlink subframes, thus they are not used to transmit the random access occasion.

It should be noted that the time unit is the subframe both in the examples illustrated in FIGS. 4 and 5. The time unit may be a slot or a symbol in other possible implementations.

Processing of FIG. 6 will be explained as follows. if one random access occasion occupies $k_m$ time units, $k_m$ adjacent uplink time units are associated and mapped. This processing is different from the one described previously in that the present processing considers only the uplink time unit, regardless of the downlink time unit, which leads to a higher utilization efficiency but may risk an interrupting of the preamble sequence by the downlink time units.

In the example illustrated in FIG. 6, each random access occasion needs two subframes, therefore every two uplink subframes are used to transmit one random access occasion. In FIG. 6, the second random access occasion is associated to two subframes separated in the time domain and transmitted.

It should be noted that the time unit is the subframe in the example illustrated in FIG. 6. The time unit may be a slot or a symbol in other possible implementations.

Above describes the determination manners of the time-frequency resources of the random access occasions applicable to the FDM (FIG. 3) and TDM (FIGS. 4, 5 and 6), respectively.

Another manner for determining the time index of the random access occasion is to add indices of the available time units of the random access occasions in the random access channel to an index table of the random access channel configuration. Such manner is also applicable to the frame structure of both the FDM and the TDM.

Figure 7:
FIG. 7 is an exemplary view illustrating a time index determination manner of the random access occasion according to the first embodiment of the present disclosure.
Figure 8:
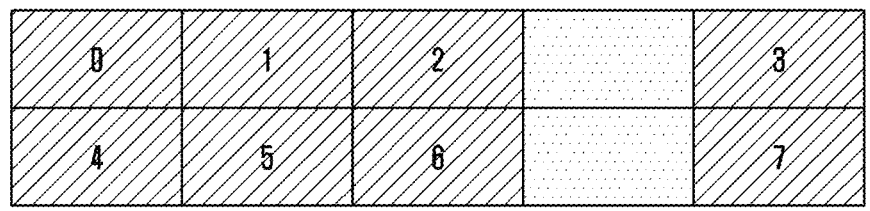
FIG. 8 is an exemplary view illustrating another time index determination manner of the random access occasion according to the first embodiment of the present disclosure.

FIG. 7 is an exemplary view illustrating a time index determination manner of the random access occasion according to the first embodiment of the present disclosure; and FIG. 8 is an exemplary view illustrating another time index determination manner of the random access occasion according to the first embodiment of the present disclosure.

For example, the indices of the available time units of the random access occasions are added in the random access channel configuration index. One possible representation is shown in Table 2 below.

TABLE 2 example of index table of another random access channel configuration

| Index | Preamble Sequence Format | Density of Random Access Channel | Number of Random Access Occasions | Time-Frequency Resource Information | Available Time Units Of Random Access Occasion |
|---|---|---|---|---|---|
| 0 | 0 | 0.5 | 8 | $(t_0, n_0)$ | (1, 2, 3, 5) |
| 1 | 0 | 1 | 16 | $(t_1, n_1)$ | (1, 2, 3) |
| 2 | 1 | 1 | 8 | $(t_2, n_2)$ | (1, 3, 5) |
| 3 | 1 | 2 | 16 | $(t_3, n_3)$ | (1, 5) |
| ... | ... | ... | ... | ... | ... |

In the Table 2, a parameter representing the available time unit of the random access occasion is added, and the number of the available random access occasions in the time domain may be acquired through the available time units of the random access occasions directly. In the Table 2, the available time unit is represented by an offset with respect to the time unit of the first random access occasion in the random access channel. For example, the available time units of the random access occasions in the index 0 is (1, 2, 3, 5), which denotes that the available time units of the random access occasions are the 1st, 2nd, 3rd and 5th time units with respect to the first random access occasion in the random access channel, as illustrated in FIG. 7.

In the above example, the first time unit is the time unit position indicated in the random access channel configuration information. The available time units of the random access occasions in the index table may be calculated from the first time unit, and the start number of the indices, namely the index of the first time unit, is 1. In other possible implementations, the index of the first time unit may start from 0.

In the method described above, the available time unit is a relative value, that is, the time unit index with respect to the first time unit of the random access channel. In other possible implementations, it also may be represented as a time unit absolute value, for example, the time index of the available random access occasion may be the index of a possible subframe, a possible slot or a possible symbol.

After receiving the random access channel configuration information, the terminal needs to determine a time position of the random access occasion after it calculates the time-frequency indices of the random access occasions associated with the selected synchronization signal blocks. The terminal determines the time positions and frequency positions of the random access occasions according to information on available time units of the random access occasions in the random access channels configuration information and the preset mapping rules.

A possible preset rule may be to map the random access occasions in the time first criterion. If the available time units exhaust but the mapping of the random access occasions has not completed, the mapping of the random access occasions may be continued with an adjacent band and the same available time units. One simple example is illustrated in FIG. 8.

In FIG. 8, there are 8 random access occasions needed to be mapped in total, but the available time units of the random access occasions are subframes 1, 2, 3, 5, and the mapping manner is as illustrated in FIG. 8. the random access occasion with index of 0 is associated to the subframe 1 in one band, the random access occasion with index of 1 is associated to the subframe 2 in this band, the random access occasion with index of 2 is associated to the subframe 3 in this band, the random access occasion with index of 3 is associated to the subframe 5 in this band, the random access occasion with index of 4 is associated to the subframe 1 in a next adjacent band, the random access occasion with index of 5 is associated to the subframe 2 in the next adjacent band, the random access occasion with index of 6 is associated to the subframe 3 in the next adjacent band, and the random access occasion with index of 7 is associated to the subframe 5 in the next adjacent band.

It should be noted that the available time unit of the random access occasion described above should be understood as the index of the first time unit of the random access occasions. In the preamble sequence format utilized actually, the single entire preamble sequence may occupy a plurality of time units. The time unit may be the subframe, the slot, a mini slot or the symbol.

In the above descriptions, the mapping in the frequency domain is in a form of continuous mapping.

In other possible implementations, the mapping in the frequency domain may be in a form of hopping. For example, an index $n_w$ of physical resource block in wth available band is specified as:

$$n_w = \begin{cases} n + \dfrac{w_{msg1} w}{2}, & w \text{ is an even} \\ N_{UL} - (n + w_{msg1}(w+1)/2), & w \text{ is an odd} \end{cases}.$$

Wherein is a number of the physical resource blocks included in allocated uplink bandwidth. The uplink bandwidth may be entire available uplink bandwidths, or may be an available bandwidth dedicated to transmit the random access channel.

It should be noted that meanings of the density and the number of the available random access channels in the frequency domain included in the random access channel configuration information are as follows.

According to the time-frequency resource information and the density in the random access channel configuration information, the terminal determines a plurality of random access channels (each random access channel would include a plurality of random access occasions) in the time domain, that is, one synchronization signal block may associate a plurality of random access occasions in the different random access channels. The terminal may select the random access occasions to transmit the preamble sequences according to the predetermined criterions. One possible criterion may be set to select the random access occasion with a minimum delay to transmit the preamble sequences; another possible criterion may be set to select the random access occasion in the current radio frames, or the subframes or the slots at an equal probability to transmit the preamble sequences.

According to the time-frequency resource information and the number of the available random access channels in the random access channel configuration information, the terminal determines a plurality of random access channels (each random access channel would include a plurality of random access occasions) in the frequency domain, that is, one synchronization signal block may associate a plurality of random access occasions in the different random access channels. The terminal may select the random access occasions to transmit the preamble sequences according to the predetermined criterions. One possible criterion may be set to select the random access occasion at an equal probability to transmit the preamble sequences.

Second Embodiment

A indication manner of the physical random access channel configuration information would be discussed in connection with a detailed system in the present embodiment. Assumptions for the present embodiment is as those as for the First Embodiment. That is: the different synchronization signal blocks are assumed to use different downlink transmitting beams; the association is assumed to be implemented in the preset manner, namely the association is known by the base station and the terminal; the random access channel is assumed to be consisted of the plurality of random access occasions, and one random access occasion is used to transmit the preamble sequences defined by one random access preamble sequence format.

The First Embodiment (as illustrated in FIGS. 2-8) specifies an one-to-one relationship of association between the synchronization signal blocks and the random access occasions. In the present embodiment, the plurality of synchronization signal blocks may be associated to a plurality of same or different random access occasions. Regarding a case where the plurality of synchronization signal blocks are associated with the one same random access occasion, its exemplary banding manner may be as illustrated in FIG. 9. FIG. 9 is an exemplary view illustrating the case where the plurality of synchronization signal blocks are associated with the same random access occasion according to the second embodiment of the present disclosure, wherein a mapping relationship exists between the plurality of synchronization signal blocks and the one random access occasion.

Figure 9:
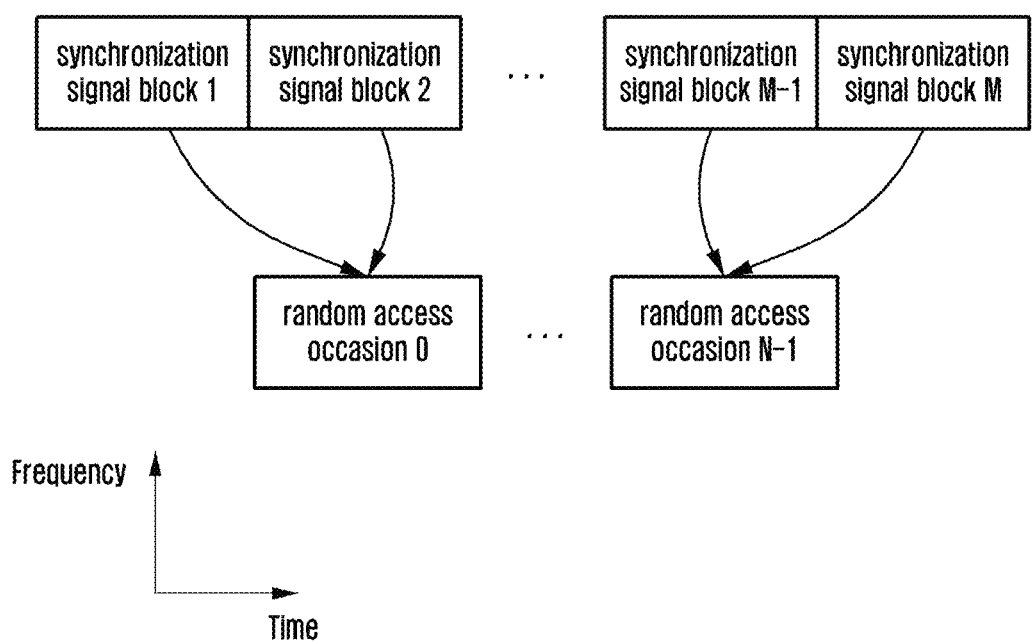
FIG. 9 is an exemplary view illustrating an association between a plurality of synchronization signal blocks and a same random access occasion according to a second embodiment of the present disclosure, wherein a mapping relationship exists between the plurality of synchronization signal blocks and one random access occasion.

In FIG. 9, every two synchronization signal blocks are associated with the one random access occasion.

In the present embodiment, the manner for acquiring the random access channel configuration by the terminal is similar to that of the First Embodiment. The terminal acquires the optimal synchronization signal block according to the downlink measurement result at first; the terminal reads the index of the synchronization signal block, and the random access channel configuration information and the preamble sequence resource pool information carried therein; the terminal selects the preamble sequence from the preamble sequence resource pool, and determines the time-frequency resource of the random access occasion according to the random access channel configuration information and the association between the synchronization signal blocks and the random access occasions.

In the present embodiment, the random access channel configuration information transmitted in the respective synchronization signal blocks is same. That is to say, both the MIBs in the broadcast channel and the SIBs indicated by the MIBs transfer same contents.

If the association between the synchronization signal blocks and the random access occasions is determined in the predetermined manner, it is defined that the number of the synchronization signal blocks associating with the same random access occasion is S and the random access occasions is assigned in the time domain first criterion. If the index of the synchronization signal block starts from 0 and the number of available random access occasions in the time domain is $M_{RO}$, the time domain index of the random access occasion associated with the synchronization signal block $n_{SS}$ is calculated as:

$$m_{RO} = \mathrm{mod}(\lfloor n_{SS}/S \rfloor, M_{RO}),$$

and the frequency domain index of the random access occasion associated with the synchronization signal block $n_{SS}$ is calculated as:

$$n_{RO} = \lfloor \lfloor n_{SS}/S \rfloor / M_{RO} \rfloor.$$

In another manner for determining the random access occasions, the random access occasions are assigned in the frequency domain first criterion. If the index of the synchronization signal block starts from 0, and the number of available random access occasions in the frequency domain is $N_{RO}$, the time domain index of the random access occasion associated with the synchronization signal block $n_{SS}$ is calculated as:

$$m_{RO} = \mathrm{mod}(\lfloor n_{SS}/S \rfloor, N_{RO}),$$

and the frequency domain index of the random access occasion associated with the synchronization signal block $n_{SS}$ is calculated as:

$$n_{RO} = \lfloor \lfloor n_{SS}/S \rfloor / N_{RO} \rfloor.$$

The terminal may obtain the time-frequency position of the random access occasion after it obtains the index of the random access occasion in the random access channel. The detailed method may refer to the method described in the First Embodiment, and details are omitted here.

If the association between the synchronization signal blocks and the random access occasions is determined in a configured manner, the information on the number of the synchronization signal blocks associated with the same random access occasion is added to the random access channel configuration information. An index table of the random access channel configuration with such manner is as shown in Table 3 below.

TABLE 3 example of index table of a further random access channel configuration

| Index | Preamble Sequence Format | Density of Random Access Channel | Number of Random Access Occasions | Number Of Random Access Occasions In Time Domain | Tune-Frequency Resource Information | Number Of Synchronization Signal Blocks |
|---|---|---|---|---|---|---|
| 0 | 0 | 0.5 | 8 | 4 | $(t_0, n_0)$ | 1 |
| 1 | 0 | 1 | 16 | 8 | $(t_1, n_1)$ | 1 |
| 2 | 1 | 1 | 8 | 8 | $(t_2, n_2)$ | 2 |
| 3 | 1 | 2 | 16 | 8 | $(t_3, n_3)$ | 2 |
| ... | ... | ... | ... | ... | ... | ... |

In the example shown in Table 3, a parameter representing the number of the synchronization signal blocks is added. This parameter should be understood as the number of the synchronization signal blocks associated with the same random access occasion.

In this case, the terminal may acquire the parameters for the time-frequency resources of the random access occasions according to the random access channel configuration, and acquire the time-frequency positions of the random access occasions in accordance with the process described above.

Third Embodiment

A indication manner of the physical random access channel configuration information would be discussed in connection with a detailed system in the present embodiment. Assumptions for the present embodiment is as those as for the First Embodiment. That is: the different synchronization signal blocks are assumed to use different downlink transmitting beams; the association is assumed to be implemented in the preset manner, namely the association is known by the base station and the terminal; the random access channel is assumed to be consisted of the plurality of random access occasions, and one random access occasion is used to transmit the preamble sequences defined by one random access preamble sequence format; and as the association between the synchronization signal blocks and the random access occasions, the one synchronization signal block is assumed to have the mapping relationship with one random access occasion.

In the present embodiment, the manner for acquiring the random access channel configuration by the terminal is similar to that of the First Embodiment. The terminal acquires the optimal synchronization signal block according to the downlink measurement result at first; the terminal reads the index $n_{SS}$ of the synchronization signal block, and the random access channel configuration information and the preamble sequence resource pool information carried therein; the terminal selects the preamble sequence from the preamble sequence resource pool, and determines the time-frequency resource of the random access occasion according to the random access channel configuration information and the association between the synchronization signal blocks and the random access occasions.

In the present embodiment, the information transmitted in the respective synchronization signal blocks may be different. In a first implementation of the present embodiment, the information provided by the random access channel configuration information comprises contents such as the random access preamble sequence format supported by the random access channel configuration, the time-frequency resource information of the random access channel, etc. The random access channel configuration information is same all over the synchronization signal blocks. That is, the same system utilizes the same random access channel configuration information.

Besides the random access channel configuration information, the synchronization signal block carries the offset of the time-frequency position of the random access occasion associated with the synchronization signal block, with respect to the time-frequency position provided in the random access channel configuration. Particularly, the offset of the time-frequency resource may be represented as the number of the time units and the number of the physical resource blocks. For example, the information carried in the synchronization signal block $n_{SS}$ comprises: the random access channel configuration information, the random access preamble sequence resource pool information and the time-frequency offset of the random access occasion associated with the synchronization signal block $n_{SS}$. The offset information may be carried by the MIBs in the broadcast channel or the SIBs indicated by the MIBs.

Below will describe a simple example. If the time-frequency resource information provided in the random access channel configuration information is (t, n) while the offset information carried in the synchronization signal block $n_{SS}$ is $t_{SS}$ and $n_{SS}$, the time domain position of the random access occasion associated with the synchronization signal block $n_{SS}$ is $t+t_{SS}$ and the frequency domain position is $n+n_{SS}$. It should be noted that the time domain position of the random access occasion should be understood as the time unit index of the first time unit of the random access occasion, and the frequency domain position should be understood as the index of the physical resource block.

The terminal reads the random access channel configuration information and the corresponding offset information from the synchronization signal block, determines the time-frequency resource of the random access occasion associated with the synchronization signal block, selects the preamble sequence from the preamble sequence resource pool read from the synchronization signal block, generates the preamble sequence according to the preamble sequence format in the random access channel configuration information, and transmits the same in the corresponding random access occasion.

In a second implementation of the present embodiment, the random access channel configurations carried in the different synchronization signal blocks are not same, and the time-frequency resource information in the random access channel configuration may represent the time-frequency resource information of the random access occasion associated with the synchronization signal block.

After reading the random access channel configuration, the terminal can directly acquire the position information of the time-frequency resource of the random access occasion associated with the synchronization signal block and transmit the preamble sequence on the time-frequency resource.

In this case, the content of the random access channel configuration information should at least include the format of the random access preamble sequence, the time-frequency resource of the random access occasion and density of random access channel and etc.

It should be noted that the above random access channel configuration is given in a form of look-up table and only index of the corresponding configuration is indicated as indication. Another indication manner is to indicate the contents of the random access channel configuration in signaling directly.

Fourth Embodiment

A indication manner of the physical random access channel configuration information would be discussed in connection with a detailed system in the present embodiment. In the present embodiment, it is assumed that the random access channel configuration information is transmitted on a Remaining Minimum System Information (RMSI) and contents of the RMSI on the different downlink signals (corresponding to the different downlink beams) are same.

Embodiments described previously briefly introduce configuring of the association between the downlink signals (such as the downlink synchronization blocks) and the random access occasions. The present embodiment indicates the corresponding association in a manner of displaying a indication. Meanwhile, the association may be indicated together with the random access channel configuration information, as a part of the random access channel configuration (for example, by adding a new field for indicating the association between the indices of the downlink signals and the random access occasions) or as an independent signaling. These two indication manners have no essential differences, and the present embodiment will explain the first manner, namely the manner of carrying the indication of the association in the random access channel configuration information, as an example.

In the present embodiment, an indication of the information on the random access occasions associated with the each synchronization signal block is displayed. Wherein the information on the random access occasion is the resource index of the random access occasion which is configured in a predetermined manner or is determined in a predetermined criterion. The information on the random access occasion may further comprise the subframe index of the random access occasion and a PRB index with which the time-frequency resources of the available random access occasions may be determined.

A possible manner of displaying the indication is to establish a look-up table as shown in Table 4 below, and obtain the information on the corresponding random access occasion through the downlink signal index (for example, the index of the synchronization signal block or an index of a possible CSI-RS).

TABLE 4 relationship table for downlink signal index and information on random access occasion.

| Index Of Downlink Signal | Information On Random Access Occasion |
|---|---|
| 0 | Information 0 |
| 1 | Information 1 |
| 2 | Information 2 |
| ... | ... |

The above table may be indicated in a form of tuple, that is, the indication is in a form of ($n_{SS}$, $n_{PRACH}$), wherein $n_{SS}$ is the index of the downlink signal, and $n_{PRACH}$ is the information on the random access occasion. In a further indication manner, a sequence of the information on the random access occasions is indicated directly, and a number of elements in the sequence is same as the number of the synchronization signal blocks, each element presents the time-frequency resource information of the random access occasion corresponding to the respective synchronization signal block.

Another indication manner utilizes a bit map. The number of the random access occasions is fixed to each random access channel configuration. When the association between the synchronization signal blocks and the random access occasions is indicated, a bit sequence of 0, 1 with a length of the number of the random access occasions is established for the each synchronization signal block, each element therein represents whether the synchronization signal block corresponds to the corresponding random access occasion, and it is denoted that the random access occasion with the corresponding index associates with the synchronization signal block if the element is 1, otherwise does not associate. For example, for a certain random access channel configuration information, if the number of the available random access occasions is M, the length of the bit sequence for configuring and indicating the corresponding random access occasions is M, wherein the bit sequence comprises M−1 0s and one 1, and the position of 1 denotes the index of the random access occasion. When the association is configured and indicated in such a manner, each synchronization signal block requires a bit sequence with the length of M to be established, and a total overhead is in positive proportion to a product of the number N of the synchronization signal blocks and the number M of the random access occasions.

As utilizing the bit map, another manner is to establish a bit sequence of 0, 1 with a length of the number of the synchronization signal blocks for each random access occasion, each element therein represents whether the synchronization signal block with the corresponding index associates with the random access occasion. If the element is 1, it is denoted that the synchronization signal block with the corresponding index at this position associates with the random access occasion, otherwise, it is denoted un-associating. For example, regarding a system including N synchronization signal blocks, a bit sequence with the length of N is established for each random access occasion, wherein 0, 1 denote whether the synchronization signal block at the corresponding position associates with the random access occasion. Taking a bit sequence [0 1 1 0 0 0 0 0] with the length of 8 as an example, it presents 8 synchronization signal blocks existed in total, the elements at positions 1 and 2 in the bit sequence are 1, which denote that the synchronization signal blocks with the indices 1, 2 associate with the random access occasion. When the bit map indication manner is utilized, each random access occasion requires a bit sequence with the length of N to be established, and a total overhead is in positive proportion to a product of the number N of the synchronization signal blocks and the number M of the random access occasions.

Another manner of indicating the association between the downlink signal indices and the random access occasions by the bit map is to directly indicate the indices of the time domain resource and the frequency domain resource of the random access occasion associated with the downlink signal by the bit map. For example, an index of a symbol from which the random access occasion associated with the downlink signal starts in a subframe is indicated using the bit map; meanwhile, an index of a start PRB of the random access occasion is indicated using the bit map. Regarding a frame structure including 7 or 14 symbols, a bit sequence with the length 7 or 14 is established for each downlink signal (for example, the synchronization signal block or the CSI-RS), wherein a value of each bit presents whether the symbol at the corresponding position is the start symbol of the random access occasion associated with the downlink signal. If the bit is 1, it is the start symbol of the random access occasion, otherwise, it is not. Meanwhile, a bit sequence with a length of the number of the PRBs available to random accessing is established, wherein each element presents whether the symbol at the corresponding position is the start PRB of the random access occasion associated with the downlink signal. If the element is 1, the PRB at the corresponding position is the start PRB, otherwise, it is not.

In another configuration manner, the time domain index is indicated and configured in the manner of bit map, and the frequency domain index is indicated with the PRB index.

After adding the above indication of the association, the format of the random access channel configuration information is as follows:

{a preamble sequence format, a time-frequency resource information of random access channel, an association between synchronization signal blocks and random access occasions}.

The above format is indexed and numbered, and transmitted to the terminal in a form of number. When the association between the synchronization signal blocks and the random access occasions is indicated by the index of the random access channel configuration, the possible indices may be many. In another indication manner, only the preamble sequence format and the time-frequency resource information of the random access channel is indicated for the random access channel configuration, and the association between the synchronization signal blocks and the random access occasions is indicated separately with the index of the random access channel configuration. Such indication manner can establish the association between the synchronization signal blocks and the random access occasions flexibly. It should be noted that the time-frequency resource information of the random access channel described previously comprises the implementations of the time-frequency resource information in the previous embodiments.

Fifth Embodiment

In the present embodiment, an indication manner of the physical random access channel configuration information will be discussed. In the present embodiment, the base station is assumed to operate with multi-beam or single-beam. For the multi-beam operation, the downlink synchronization signal and the broadcast channel are transmitted in a manner of a plurality of synchronization signal blocks. Wherein each synchronization signal block is transmitted via one downlink transmission beam, and the downlink transmitting beams utilized for the different synchronization signal blocks may be same or not. For the single-beam operation, transmitting of the downlink synchronization signal and the broadcast channel are completed via one synchronization signal block or a periodic repetition of the one synchronization signal block. Each synchronization signal block comprises a primary synchronization signal, a secondary synchronization signal and a broadcast channel bearing the MIBs. Other necessary information for accessing the system is transmitted in the RMSI. The contents in the RMSI indicated and transmitted in the different synchronization signal blocks are same.

The method provided by the present embodiment is applicable to both the above base stations operating with the multi-beam and the single-beam, and provides a certain flexibility of the system without introducing apparent redundant signaling. A general concept of the solution provided by the present embodiment is in that: the random access channel configuration information transmitted is adjusted according to the number of the synchronization signal block transmitted actually, so that the manner according to the present embodiment can be applicable to the system of the single-beam operation as well as the system of the multi-beam operation wherein the number of the synchronization signal blocks transmitted actually varies.

One possible implementation is to indicate possible configurations directly instead of indicating the physical random access channel configuration information via the index of the look-up table. Meanwhile, the random access channel configuration information for the different synchronization signal blocks may be different, and indicated in a manner of enumeration. The random access channel configuration information for each synchronization signal block may comprise:

a format information of the random access preamble sequence;

a time domain index of the random access occasion;

a time domain density/period of the random access occasion;

a frequency domain index of the random access occasion; and a number of the random access occasions in the frequency domain.

Meanings of the respective parameters in the above random access channel configuration information are as follows. The preamble sequence format defines an interval of subcarriers in the random access channel, a sequence repetition number of the preamble sequence utilized or a number of the sequences, and a length of Cyclic Prefix. Based on such information, the terminal can acquire a duration in the time domain and a bandwidth in the frequency domain of the random access occasion.

The time domain index of the random access occasion may be indicated via an index of a start time unit of the random access occasion, for example, an index of a start subframe or an index of a start slot, or an index of a mini slot, or an index of a start symbol, of the random access occasion. The time domain density/period of the random access occasion specifies a frequency domain in which the random access occasion associated with the synchronization signal block occurs. This parameter may be configured as follows: the number of the random access occasions occurred in a set of time units, or a number of the time units within an interval between two adjacent random access occasions associated with the synchronization signal block. Wherein the set of the time units may be a set of a plurality of continuous time units. For example, if the time unit is represented by the symbol, the set of time units is the slot or mini slot; if the time unit is represented by the slot or the mini slot, the set of time units is the subframe; and if the time unit is represented by the subframe, the set of the time units is the ratio frame.

The frequency domain index of the random access occasion may be indicated via the index of the start physical resource block of the random access occasion. The number of the random access occasions in the frequency domain is used to indicate the number of the random access occasions in the frequency band for the uplink random accessing. The parameter may be replaced with the number of the physical resource blocks within an interval between two adjacent random access occasions in the frequency domain.

The series of parameters described above can determine a structure and the time-frequency resources of the random access occasions associated with the synchronization signal block. The terminal can acquire the time-frequency resources of the random access occasion completely after acquiring the above parameters.

The parameters for determining the time-frequency resource for the random access occasion may be replaced with other parameters as follows: for the time domain parameters (including the time domain index of the random access occasion and the density/period of the random access occasion) may be replaced with the available time units within the set of the time units. For example, if the time unit is represented as the subframe, the index of the available subframe within the unit radio frame is indicated; if the time unit is represented as the slot/mini slot, the available slot or mini slot within the unit subframe is indicated; if the time unit is represented as the symbol, the available symbol within the unit slot is indicated. One or more available time units exist in the set of the time units and are indicated via a vector or a sequence.

For the frequency domain parameters (including the frequency domain index of the random access occasion and the number of the random access occasion in the frequency domain) may be determined in following manners. One manner is to indicate the index of the first physical resource block of the available random access occasion, and the indication and configuration are in a form of index sequence. Alternatively, the number of the physical resource blocks within the interval between two adjacent random access occasions is indicated. Another manner is to determine the frequency domain resource according to predetermined rules. For example, it is specified in advance that the resource mapping is in a time domain first manner, the number of the physical resource blocks within the interval between the two adjacent random access occasions in the frequency domain is specified and indicated, the number of the available random access occasions within the set of the time units and the index of the available time units within the set of the time units are indicated. After receiving the above information, the terminal maps in the time domain according to the given frequency domain indices at first, and if the number of the indices of the available time units is smaller than the number of the random access occasions, determines a next available frequency domain position according to the available frequency domain indices or the interval between the physical resource blocks of the adjacent random access occasions in the frequency domain after the indices of the units in the time domain end, and performs the time domain mapping at the frequency domain position until the time-frequency resources are determined for all of the random access occasions.

The above parameters are required to be configured and indicated for each synchronization signal block, and the random access channel configuration information comprises parameters as follows:
   the indices of the synchronization signal blocks;
   the preamble sequence format; and
   related information on the time-frequency resource of the random access occasion.

Wherein the related information on the time-frequency resource of the random access occasion comprises the parameters for determining the time-frequency resource of the random access occasion described above. The random access channel configuration information may be indicated in a following manner:
   the number N of the synchronization signal blocks;
   {index 0 of the synchronization signal block, preamble sequence format, time-frequency resource of random access occasion};
   {index 1 of the synchronization signal block, preamble sequence format, time-frequency resource of random access occasion};
   . . .
   {index N−1 of the synchronization signal block, preamble sequence format, time-frequency resource of random access occasion}.

That is, the configuration information of the random access occasions corresponding to the N synchronization signal blocks is indicated in the form of enumeration. Furthermore, the number N of the synchronization signal blocks is the number of the synchronization signal blocks transmitted actually, and may be transmitted separately or in the MIB.

The configuration and indication manner described above would lead to a great overhead when the number of the synchronization signal block is large. One efficient manner for reducing the overhead is to extract a common part(s). If the random access occasions corresponding to the different synchronization signal blocks use a same preamble sequence format, it may be indicated in a following manner:
   the number N of the synchronization signal blocks;
   the preamble sequence format;
   {index 0 of synchronization signal block, time-frequency resource of random access occasion};
   {index 1 of synchronization signal block, time-frequency resource of random access occasion};
   . . .
   {index N−1 of synchronization signal block, time-frequency resource of random access occasion}.

Wherein the number N of the synchronization signal blocks is the number of the synchronization signal blocks transmitted actually, and may be transmitted separately or in the MIB.

If the time-frequency resource information of the random access occasions corresponding to the different synchronization signal blocks has a common part, the common part may be also extract to save signaling. For example, if the random access occasions corresponding to the different synchronization signal blocks uses the same frequency domain resources, the indication manner is as follows:
   the number N of the synchronization signal blocks;
   the preamble sequence format;
   the frequency domain index;
   the number of the random access occasions in the frequency domain;

{index 0 of synchronization signal block, time domain position information of random access occasion};
{index 1 of synchronization signal block, time domain position information of random access occasion};
. . .
{index N−1 of synchronization signal block, time domain position information of random access occasion}.

Wherein the number N of the synchronization signal blocks is the number of the synchronization signal blocks transmitted actually, and may be transmitted separately or in the MIB. The frequency domain index and the number of the random access occasions in the frequency domain are used to determine the frequency domain position of the random access occasion, and may be replaced with other replacements described above. Additionally, the above example assumes that the random access occasions corresponding to the different synchronization signal blocks use the same preamble sequence format which can be indicated commonly. Similarly, the above manner is also applicable to a case where the different random access occasions use the same or different preamble sequence formats, and the preamble sequence formats should not be indicated and configured commonly in this case.

If the random access occasions corresponding to the different synchronization signal blocks use the same density, it may be indicated and configured in a following manner:
the number N of the synchronization signal blocks;
the preamble sequence format;
an indication of the time domain density/period of the random access occasion;
{index 0 of synchronization signal block, time domain position information of random access occasion};
{index 1 of synchronization signal block, time domain position information of random access occasion};
. . .
{index N−1 of synchronization signal block, time domain position information of random access occasion}.

Wherein the number N of the synchronization signal blocks is the number of the synchronization signal blocks transmitted actually, and may be transmitted separately or in the MIB. The above indication manner is also applicable to a case where the different synchronization signal blocks use the same or different preamble sequence format.

With the above indication and configuration manner, as accessing initially, the terminal determines the synchronization signal blocks according to the measurement result, acquires the configuration information of the corresponding random access occasion according to the indices of the synchronization signal blocks (for example, logic indices of the synchronization signal block, or the time domain indices of the synchronization signal blocks, which is acquired from the primary synchronization signal, the secondary synchronization signal and information in the MIBs as accessing initially), and transmits the preamble sequence on the random access occasion.

In the above configuration manner, the synchronization signal blocks are indexed to configure the time-frequency resource of the random access occasion. Such manner is more suitable to the case where the one-to-one mapping relationship exists between the synchronization signal blocks and the random access occasions, that is, the different synchronization signal blocks are associated to the random access occasion not overlapping with each other. As to the case where the plurality of synchronization signal blocks are associated to the same random access occasion, the above configuration manner may be also used but may lead to some redundant signaling.

Another indication manner is to index the random access occasions in order to configure and indicate. In such a configuration and indication manner, the signaling content needed to be configured is as follows:
{time-frequency resource information 0 of random access occasion, preamble sequence format, index of corresponding synchronization signal block};
{time-frequency resource information 1 of random access occasion, preamble sequence format, index of corresponding synchronization signal block};
. . .
{time-frequency resource of information M−1 of random access occasion, preamble sequence format, index of corresponding synchronization signal block}.

In the above configuration, the corresponding time-frequency resource information and the corresponding preamble sequence format information are configured for each random access occasion. Meanwhile, the index of the synchronization signal block corresponding to the random access occasion is further configured. As to a case where one random access occasion is associated with several synchronization signal blocks, an index sequence of the synchronization signal blocks may be indicated. Further, as to a case where the different random access occasions have the same parameter(s) (such as the same preamble sequence format, and the like), the common parameter may be extracted to indicate and configure separately.

The above indication manner indicates the actual configuration information. Another possible manner may list the possible configuration manners as an index table including the preamble sequence format and the previously mentioned configuration information of the random access occasion. When the configuration information of the random access occasion is indicated and configured, the indication manner is as follows:
the number N of the synchronization signal blocks;
{index 0 of synchronization signal block, configuration index 0 of random access occasion};
{index 1 of synchronization signal block, configuration index 1 of random access occasion};
. . .
{index N−1 of synchronization signal block, configuration index N−1 of random access occasion}.

Wherein the number N of the synchronization signal blocks is the number of the synchronization signal blocks transmitted actually, and may be transmitted separately or in the MIB.

The configuration index table of the random access occasions may be an index table below.

TABLE 5 example of index table of random access occasion configuration

| Index | Preamble Sequence Format | Time-Frequency Resource Configuration |
|---|---|---|
| 0 | Format Index 0 | Configuration 0 |
| 1 | Format Index 1 | Configuration 1 |
| . . . | . . . | . . . |
| K | Format Index K | Configuration K |

It should be noted that the above table only lists parameters which are possible to occur in the configuration index table of the random access occasion, and the format indices corresponding to the different indices may be same, that is to say, for the different indices, the same preamble sequence format may be used.

In order to further reduce the overhead for the configuration of the random access channel, different available index range are defined when the numbers of the synchronization signal blocks transmitted actually are different. A simple example would be discussed. If the number of the synchronization signal blocks transmitted actually is not greater than K1, the configuration index range of the available random access occasions is 1~M1; if the number of the synchronization signal blocks transmitted actually is greater than K1 but not greater than K2, the configuration index range of the available random access occasions is 1~M2; if the number of the synchronization signal blocks transmitted actually is greater than K2, the configuration index range of the available random access occasions is 1~M3; and so on, until a maximum number of the synchronization signal block transmitted is reached.

Related information of the preamble sequence resource pool is not configured in the above configuration manner. As to a case where the plurality of the synchronization signal blocks correspond to the same random access occasion, the preamble sequences are required to be grouped in order to facilitate the base station to determine the downlink transmitting beams for transmitting random access responses, and the suitable downlink transmitting beams are indicated to the base station in the group manner. Group information of the preamble sequences is required to be indicated together with the configuration information of the corresponding random access occasion, that is, the random access occasion configuration information further comprises the group information of the preamble sequences besides the time-frequency resource configuration information. The group information may be indicated in following manners:

In each random access occasion configuration information, the start index or an end index of the preamble sequence is added; or the start index of the preamble sequence and the number of the preamble sequences are added;

The respective groups of the preamble sequences are configured at first, one possible manner is to configure a number of the groups of the preamble sequences and a number of the preamble sequences in the each group;

If a total number of the preamble sequences is known (for example, the number of the total preamble sequences is predetermined, or indicated in the RMSI), only the number of the groups (group number) is needed to be indicated and configured in the random access configuration information. Meanwhile, in the random access occasion configuration information, indices of the groups of the corresponding preamble sequences are indicated. The terminal determines the indices of the preamble sequences in each group according to the total number of the preamble sequences and the number of the groups. The terminal determines the information on the preamble sequence resource pool to be used according to the indices of groups of the preamble sequences in the corresponding random access occasion configuration information.

The above manner is applicable to a case where the numbers of the preamble sequences included in the different groups of the random access preamble sequences are same. As to a case where the numbers of the preamble sequences included in the different groups are different, the number of the preamble sequences in each group may be indicated directly. For example, a possible manner is to configure and indicate using a number vector of the preamble sequences. A simple example is as follows: the total available preamble sequences are grouped into S groups, wherein the number of the preamble sequences included in the ith group comprises is $s_i$, and the indication manner is to indicate a vector of $[s_0, \ldots, s_{s-1}]$. Further, the indices of groups of the corresponding preamble sequences are added to the random access occasion configuration. The terminal determines the preamble sequence resource to be used according to the group information and the indices of the groups in the random access occasion configuration information.

If the preamble sequences in the different groups are distinguished via covering codes (orthogonal or non-orthogonal), only indices of the covering codes required to be used in the random access occasion is needed to be added to the random access configuration information.

Sixth Embodiment

In this embodiment, an indication method of a physical random access channel configuration information would be explained. In the present embodiment, the system may operate in a Frequency Division Duplex (FDD) mode or a Time Division Duplex (TDD) mode. For the FDD mode, the frequency bands are separated for the uplink and the downlink, and all of the uplink time-frequency resources are considered as being available as configuring the random access channel; and for the TDD mode, the frequency bands are shared by the uplink and the downlink, and not all of the uplink time-frequency resources can be considered as being available as configuring the random access channel. Therefore, different configuration methods are required for these two different duplex modes, or different optimization processing's are performed for a same configuration method.

At first, a configuration method of the random access channel for the FDD mode system will described briefly. In the present embodiment, the configuration of the random access channel is indicated and configured by means of a random access channel configuration index table. In particularly, the random access channel configuration index table may comprise: a physical random access channel configuration index, a preamble sequence format index, a radio frame index (or a random access channel period), a slot index and any other possible parameters.

Wherein, when the random access channel configuration information is indicated, the base station may only indicate the physical random access channel configuration index, and the terminal may determine the configuration information according to the index; the preamble sequence format index is to determine the preamble sequence format, so that the time-frequency domain structure of the random access occasion may be determined; the radio index is to determine a period of the random access channel; the slot index is to determine the slot index(indices) at which the random access channel may locate within one random access channel period.

The present disclosure determines the slot index available for the random access channel within one random access channel period by a formulaic manner. A subcarrier interval available for the random access channel is an integral multiple of 15 kHz, and is represented as follows: $SCS=15*2^u$ kHz, wherein u=0, 1, 2, . . . is an integer not smaller than 0.

According to the method provided in the present disclosure, the available slot index is determined based on a reference subcarrier interval at first, and then corresponding slot indices under other subcarrier intervals are determined according to a relationship between the other subcarrier intervals and the reference subcarrier interval. For example, given the reference subcarrier interval being 15 kHz, if the slot index is (a, b, c) under a certain physical random access channel index, namely the slot a, the slot b and the slot c may be used in the transmission of the random access channel, the available slot index under the same physical random access channel index in the other subcarrier interval ($15*2^u$ kHz) is: (a,b,c)+10*i, i=0, $2^u$.

The above manner may be described as follows: for one physical random access channel index, the available slot index within one period is (a,b,c)+10*i, i=0, $2^u$.

If it is specified that the slots within first k ms are unavailable for the random access process, the available slot index quantified according to the subcarrier interval may be in a manner that: given the reference subcarrier interval of 15 KHz, if the slot indices are (a,b,c) under a certain physical random access channel index, that is, the slot a, slot b and slot c may be utilized for the transmission in the random access channel, the available slot index under the same physical random access channel index in the subcarrier interval of $15*2^u$ kHz is: (a,b,c)*u+10*i, i=0, . . . , $2^u-1$.

The available random access channel period may comprise 10 ms, 20 ms, 40 ms, 80 ms and 160 ms. For the period being greater than 10 ms, only positions of the 10 ms frames for the transmission of the random access channel are specified. For example, for the period of 20 ms, the 10 ms frames for the transmission of the random access channel within 20 ms may be configured by specifying the available slot index as odd or even; and for other available periods, a possible manner may specify the frame index by a following manner.

For 40 ms, the available frame index is mod(Nf,4)=k, wherein Nf is the frame index, k is an integer within 0~3, and the available frame index may be determined by determining k.

For 80 ms, the available frame index is mod(Nf,8)=k, wherein Nf is the frame index, k is an integer within 0~7, and the available frame index may be determined by determining k.

For 160 ms, the available frame index is mod(Nf,16)=k, wherein Nf is the frame index, k is an integer within 0~15, and the available frame index may be determined by determining k.

The above manner may also be applied to the period of 20 ms, that is, the available frame index is mod(Nf,2)=k, wherein Nf is the frame index, k is an integer within 0~1, and the available frame index may be determined by determining k.

In other words, the random access channel period and the available frame index may be determined by the above manner, that is, by determining the parameter k in advance.

Another possible manner is in that: the available period index within the period is determined by a predetermined manner, and only the period is indicated in the random access channel configuration index. For example, a possible method is to only specify that the transmission of the random access occasion is completed within the first 10 ms in one period. In this case, only the actual random access channel period is required to be indicated.

Figure 18:
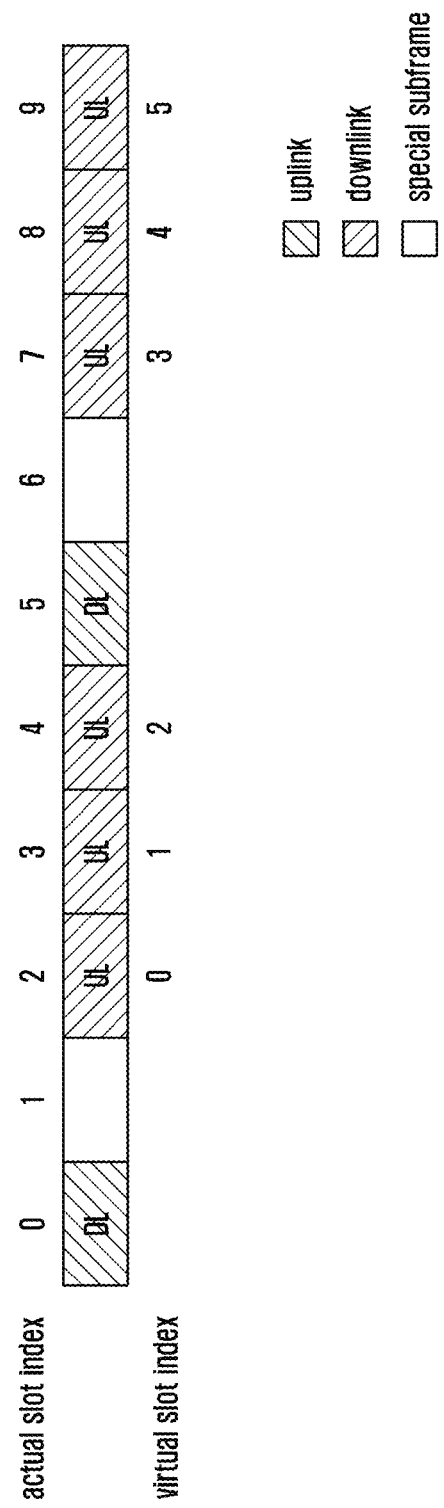
FIG. 18 illustrates an index configuration matter for an uplink/downlink configuration according to the present disclosure.

The above descriptions are aimed to the random access configuration manner of the FDD mode. For the TDD mode, the random access configuration manner designed for the FDD mode may be multiplexed while some explanations and modifications are needed. Particularly, when a certain downlink/uplink configuration manner is configured, the slot indices are determined for the available uplink time-frequency resources, and continuous virtual indices of the available uplink slots are obtained. For example, an uplink/downlink configuration is illustrated as FIG. 18, and actual indices of the uplink slots are {2,3,4,7,8,9}. The virtual indices of these six slots are {0,1,2,3,4,5}.

The slot index of the physical random access channel in the uplink/downlink configuration may be determined according to the virtual index and the available slot index in the physical random access channel configuration.

It should be further noted that, the index table used for the physical random access channel configuration may be shared by the FDD mode and the TDD mode, and the FDD mode may utilize one part of configuration index therein while the TDD mode may utilize the other part of configuration index therein. With the above manner of virtual slot index, the physical random access channel configurations for the FDD mode and the TDD mode are completed. For some special slot (for a handover to the uplink from the downlink) in the TDD mode, there are two processing methods as follows.

1. The special slot(s) would not be considered as the available uplink slot for the random access channel; and 2. The special slot(s) is considered as the available uplink slot for the random access channel, but a limitation is made for a position of its start symbol, for example, a start position of the random access channel in the special slot is fixed to start from a symbol 2.

The above parameters may determine the slot resources usable for the random access channel, but additional specifications are still required for the position of the start symbol of the random access channel inside the slot. A simple manner is to determine the position of the start symbol in each available slot by a predetermined manner. For example, the position of the start symbol in the each available slot is defined as 0, and each random access channel is arranged from the $0^{th}$ symbol in all available slots of the random access channels; alternatively, for the FDD mode and the TDD mode, two modes are predefined for the position of the start symbol, and different positions of the start symbol are used in the different modes. For example, for the FDD mode, the position of the start symbol in the each available slot is denoted as 0; and for the TDD mode, the position of the start symbol in the each available slot is denoted as 2.

In order to support more flexible positions of the start symbol, the position of the start symbol in the available slot may be configured and indicated by a manner of look-up table. For example, the position of the start symbol of the available slot may be defined by a look-up table as shown in Table 6.

TABLE 6

| Definition of Position of Start Symbol' | |
| --- | --- |
| Index | Position of Start Symbol |
| 0 | 0 |
| 1 | 2 |
| 2 | (0, 2) |
| . . . | . . . |

In the above table, a multi-component manner of the position of the start symbol may denote that a plurality of positions may be used for the transmission of the random access channel in one slot.

The above configuration and indication of the position of the start symbol may be implemented by adding indices to the physical random access channel configuration index table, and configuring the position of the start symbol in the available slot also by the physical random access channel configuration index; in another manner, the position of the start symbol is configured and indicated by separate parameters.

It should be noted that, for the random access configuration manner with a plurality of available slots, the same or different positions of the start symbol may be configured to the respective available slots. If the different positions of the start symbol are configured to the different slots, the configuration and indication may be made by a manner of index combination. For the TDD mode, the position of the start symbol may be separately configured to the special slot. That is, the same position of the start symbol is utilized for remaining uplink slots except for the special slot, and the position of the start symbol adapted to uplink/downlink symbol arrangement is configured for the special slot. Or, for the special slot, a predetermined configuration of the position of the start symbol is used, instead of using of a indicated start symbol configuration.

Seventh Embodiment

Figure 10:
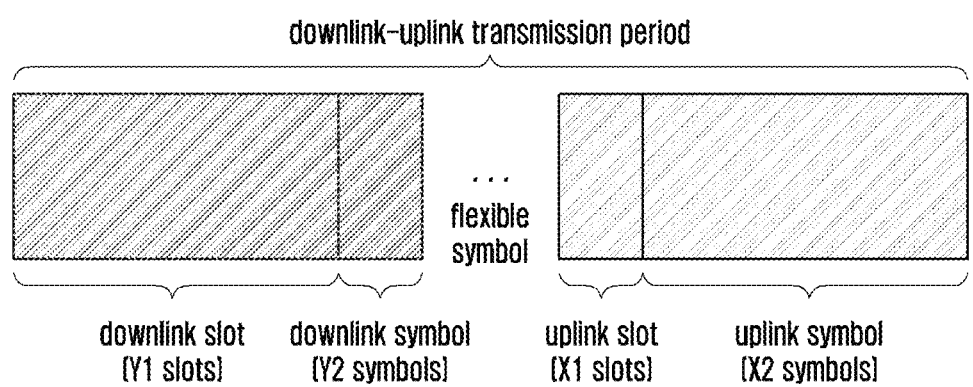
FIG. 10 is an exemplary view illustrating a structure of a TDD frame.

The present embodiment would describe a method for configuring the random access channel for a system operating in the TDD mode. As illustrated in FIG. 10, it is assumed that the system operates in a TDD frame structure as follows.

In FIG. 10, one downlink-uplink transmission period comprises a plurality of slots, these slots include X1 uplink slots, Y1 downlink slots, and remaining slots include X2 uplink symbols and Y2 downlink symbols, remaining symbols are flexible symbols, and transmission directions of the symbols are determined by a Base Station (BS)'s configuration. In a data transmission, the BS may completely determine the frame structure of the TDD in the data transmission by configuring parameters such as the downlink-uplink transmission period, X1, X2, Y1 and Y2.

In the present embodiment, following information may be acquired by the random access channel configuration index: a preamble sequence format, a length of Cycle Prefix (CP) including the preamble sequence, a length of sequence, repeat times of the sequence, and the like; the configuration period of the random access channel, including options such as 10 ms, 20 ms, 40 ms, 80 ms, etc.; slot index that may occur in the random access channel, may be a single index or an index combination; a system frame at which the random access channel may be configured in the random access configuration period, may be obtained by the modulo operation performed on 1 (for the 10 ms period), or 2 (for the 20 ms period), or 4 (for the 40 ms period) or 8 (for the 80 ms period) with respect to a system frame number, and other configuration periods are similar; a start symbol index in the slot; a number of the slots capable of configuring the random access channel; and a number of the random access occasions in one random access slot (related to the random access preamble sequence format).

For the random access, because the terminal has not access to the network, it may not determine the frame structure as shown in FIG. 10, and it is difficult to ensure no conflict occurred between the random access channel and the downlink channel. In order to settle such problem, the present embodiment proposes possible schemes as follows.

For the TDD frame structure as shown in FIG. 10, the downlink-uplink transmission period is configured and indicated in the System Information or Remaining Minimum System Information (RMSI), and the mapping of the time-frequency resources of the random access channel are defined as follows:

considering an end of each available uplink slot in the random access channel as a reference time, a time $K_{RA}$ is shift forward according to the random access configuration information and the preamble sequence format, as a starting point for transmitting the random access occasion.

The time $K_{RA}$ may be according to several manners as follows.

1a. The parameter $K_{RA}$ is educed by taking the length of CP, the length of sequence and the number of the random access occasions included in the random access slot and the like defined in the random access preamble sequence format into account. In particular, the parameter $K_{RA}$ may calculated as:

$$K_{RA}=(N_{CP}+N_{seq})*N_{RO},$$

wherein $N_{CP}$ is the length of CP, $N_{seq}$ is the length of sequence, and $N_{RO}$ is the number of the random access occasions in the random access slot.

Figure 11:
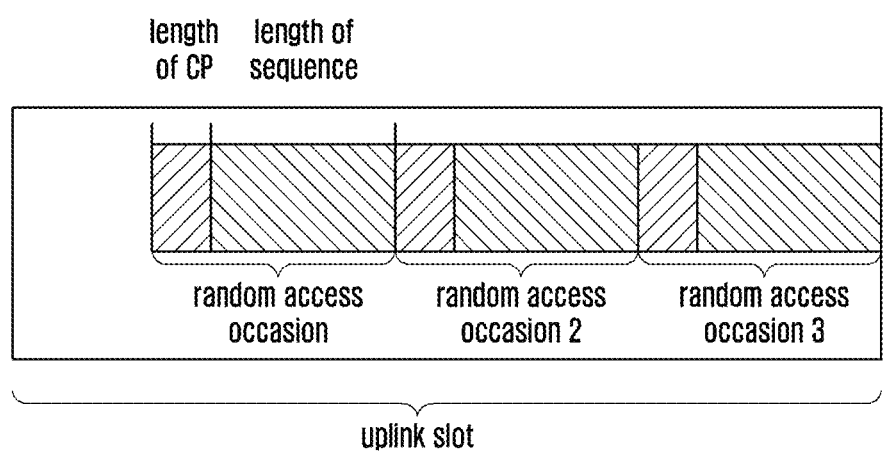
FIG. 11 illustrates a first calculation method for a start time according to the seventh embodiment of the present disclosure.

The above manner is illustrated as in FIG. 11.

In an example illustrated in FIG. 11, the random access slot comprises three random access occasions, and a length of the each random access occasion in time domain is defined by the length of CP and the length of sequence. The terminal may consider the end of the uplink slot as the reference time and educe the starting point for transmitting the random access channel forward based on the reference time.

In a case where the uplink slot comprises a plurality of random access slots, the above manner may be applied to each of the random access slots, that is, by considering the end of the random access slot as the reference time and deducing the starting time of the random access channel forward.

Figure 12:
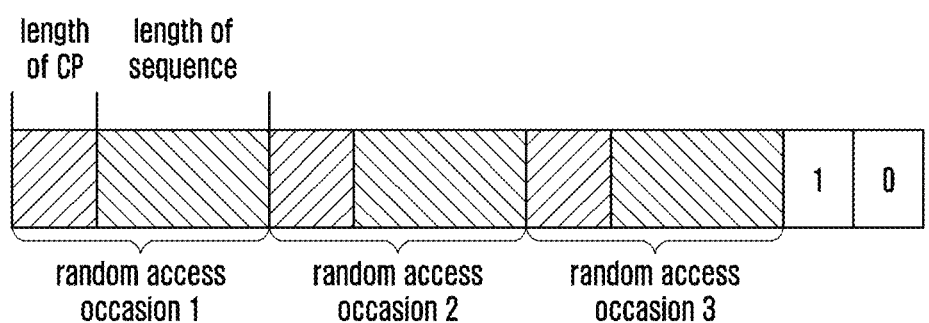
FIG. 12 illustrates a calculation method of the start time when a start symbol index is not 0 according to the seventh embodiment of the present disclosure.

In a case where a random access start symbol index is $N_{start}$ in the random access channel configuration, symbols in the uplink slot are numbered in an order from back to front, and the start time of the random access channel is educed forward from the end of the symbol with the index of $N_{start}$, as illustrated in FIG. 12.

In FIG. 12, the index of the start symbol is 2, the symbols in the random access slot are numbered in the order from back to front, and the start time of the random access channel is educed forward from the end of the symbol 2. Another method is to determine an end of the random access channel in that: for the uplink slot including $N_{sym}$ symbols, the starting point of the random access channel is educed forward from the end of the symbol $N_{sym}-1-N_{start}$. For example, in the above example, in a case of $N_{sym}=14$ symbols and $N_{start}=2$, the starting point of the random access channel is educed forward from the end of the symbol 11.

For the random access slot wherein several preamble sequence formats are combined, the starting point of the random access channel in time domain is educed forward in a manner as follows, based on the end of the random access uplink slot or according to the start symbol index:

$$K_{RA}=\Sigma_i(N_{CPi}+N_{seqi})*N_{ROi},$$

wherein $N_{CPi}$ is the length of CP for the ith preamble sequence format, $N_{seqi}$ is the length of sequence for the ith preamble sequence format, and $N_{ROi}$ is the number of the random access occasions for the ith preamble sequence format. Parameter i is counted from 1 to types of the preamble sequences.

For example, for a combination of preamble sequence formats A1 and B1, if one random access slot comprises 6 random access occasions, the first 5 use the preamble sequence format A1 and the last one uses the preamble sequence format B1, then the start time may be educed as:

$$K_{RA}=(N_{CP\_A1}+N_{seq\_A1})*5+(N_{CP\_B1}+N_{seq\_B1}).$$

1b. The parameter $K_{RA}$ is educed by taking the length of CP, the length of sequence, the number of the random access occasions included in the random access slot and the like defined in the random access preamble sequence format and a guard time into account. In particular, the parameter $K_{RA}$ may calculated as:

$$K_{RA}=(N_{CP}\pm N_{seq})*N_{RO}+N_{GT},$$

wherein $N_{CP}$ is the length of CP, $N_{seq}$ is the length of sequence, $N_{RO}$ is the number of the random access occasions in the random access slot, and $N_{GT}$ is a length of the guard time.

Figure 13:
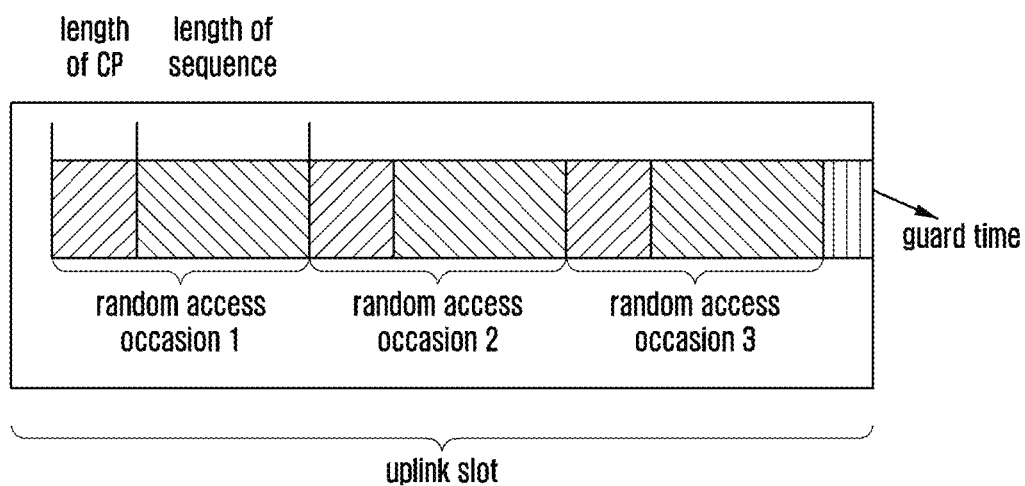
FIG. 13 illustrates a second calculation method for the start time according to the seventh embodiment of the present disclosure.

The above manner is illustrated as in FIG. 13.

Because neither the current preamble sequence format nor the current random access channel configuration information includes the length of the guard time, the length of the guard time may be acquired by following possible manner if the start time of the random access channel is educed in the manner described in the present embodiment:

the BS adds an indication and configuration of the guard time to the random access channel configuration information or the preamble sequence format;

the terminal educes the guard time according to a data structure of data channels and the random access channel. For example, the length of the guard time may be educed according to a channel structure (including the subcarrier interval, a length of CP in the data channel, a length of symbol, etc.) of an initial uplink channel including the random access channel, and the preamble sequence format.

After acquiring the above parameters, based on the end of the uplink slot, the start time of the random access channel may be educed according to the above parameters and the start symbol index.

If several preamble sequence formats may be transmitted in the random access slot, the start time of the random access channel may be educed according to a number of each type of the preamble sequences, as shown in an equation below:

$$K_{RA}=\sum_{i}(N_{CPi}+N_{seqi})*N_{ROi}+N_{GT}$$

wherein $N_{CPi}$ the length of CP for the ith preamble sequence format, $N_{seqi}$ is the length of sequence for the ith preamble sequence format, and $N_{ROi}$ is the number of the random access occasions for the ith preamble sequence format. Parameter i is counted from 1 to types of the preamble sequences, and $N_{GT}$ is the length of the guard time.

In the method described above, if a time advance and/or a time advance offset for the random access is not zero, the transmitting starting point of the random access channel in time domain may be further educed according to the time advance and/or the time advance offset based on the start position above-described.

For example, if the time advance and the time advance offset are not zero, then:

$$T_{RA}=K_{RA}+N_{TA}+N_{TA\text{-}offset},$$

wherein $N_{TA}$ is the time advance for the random access, $N_{TA\text{-}offset}$ is the time advance offset for the random access process. However, both of the $N_{TA}$ and $N_{TA\text{-}offset}$ and in the above equation may also be zero.

Figure 14:
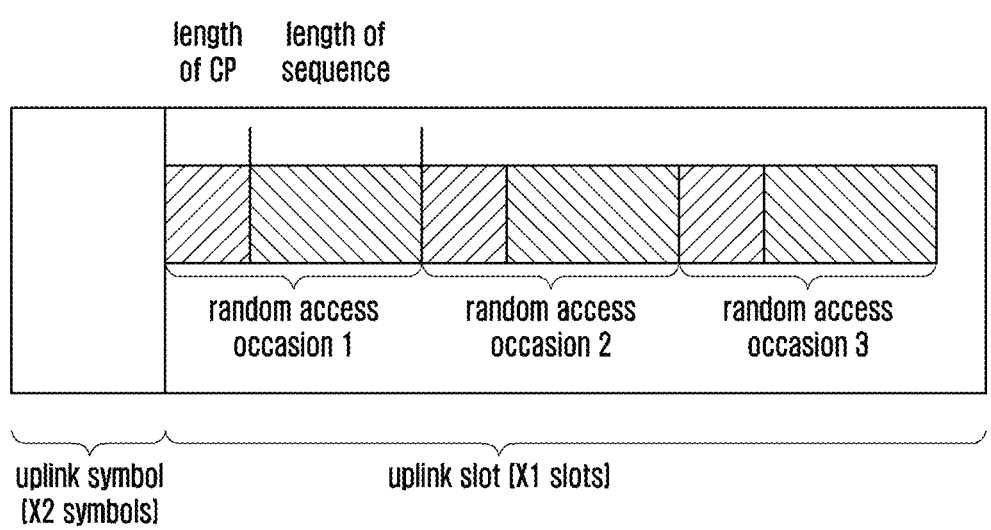
FIG. 14 illustrates a second determination method for a start position of a random access channel according to the seventh embodiment of the present disclosure.

2. For the TDD frame structure illustrated in FIG. 10, the downlink-uplink transmission period and a number X1 of uplink slots are configured and indicated in the System Information or the Remaining Minimum System Information (RMSI). According to such parameters, the terminal may acquire the start position of the uplink slot. The time-frequency resources of the random access channel are selected and mapped with the start position as a starting point. This method is as illustrated in FIG. 14.

In a case where a plurality of available random access slots are included, the starting point of each random access slot is considered as the starting point of the random access channel in time domain.

Particularly, the present method considers the starting point of each of the available uplink slots as the start position of the random access channel.

In the method described above, if a time advance and/or a time advance offset for the random access is not zero, the transmitting starting point of the random access channel in time domain may be further educed according to the time advance and/or the time advance offset based on the start position above-described.

3. A combination of two methods described above. The BS configures and indicates the downlink-uplink transmission period and the number X1 of the uplink slots in the System Information or RMSI. The terminal acquires the start position of the uplink slots according to the period information and the number of the uplink slots. The manner for determining the start position of the random access channel in method 1 is utilized for the first uplink slot in the downlink-uplink transmission period, that is, the end of the uplink slot is considered as the reference time, and the starting point position of the random access channel is educed forward according to the random access channel configuration information and the preamble sequence format; the manner for determining the start position of the random access channel in method 2 is utilized for other uplink slots, that is, the start point of the uplink slot is considered as the start position of the random access channel.

Alternatively, the manner for determining the start position of the random access channel in method 1 is utilized for the first M uplink slots in the downlink-uplink transmission period; and the manner for determining the start position of the random access channel in method 2 is utilized for the remaining uplink slots. Wherein the parameter M may be configured and indicated in the System Information and RMSI by the BS, or be configured in a predetermined manner.

It should be noted that the present embodiment does not use the X2 uplink symbols in the frame structure illustrated in FIG. 10 for the random access channel configuration.

It may specify that uplink symbols in the special subframe are not for the transmission of the random access preamble sequence.

With the method according to the present embodiment, a switching of downlink-uplink and inter-BS interferences in the TDD system may be prevented from interfering the random access channel, so that a performance of the random access process can be enhanced in the TDD system.

Eighth Embodiment

All of the previous embodiments are for the random access channel configuration in the initial access bandwidth. The configurations described above may also be applied to other random access application scenes besides the initial random access, for example, a transmission of schedule request, a random access process trigged by a downlink control channel, etc., but the random access channel may be configured in other Bandwidth Part (BWP) in order to reduce a terminal access delay, avoid frequent switches among different BWPs and the like. The present embodiment would discuss the configurations of the random access channel on other BWPs.

In the present embodiment, the BS configures the random access channel on the initial access BWP with the random access channel configuration information, etc. in RMSI, wherein the random access channel configuration is used to configure the resource in time domain of the random access channel, and the resource in frequency domain is configured and indicated by an offset of a start Physical Resource Block (PRB) with respect to the initial access BWP. Random access channel configuration for other BWPs may be in manners as follows.

1. It is specified that the same random access channel configuration information is utilized for all BWPs, and is indicated and configured by higher layer signaling or physical layer signaling commonly for cells or specified for terminals. Wherein the random access configuration information, including the random access channel configuration and a frequency domain offset, may utilize the same configuration information as the initial access BWP, and no additional signaling is required to be configured and indicated at this time; or, the random access channel configuration information as same as the initial access BWP and different frequency domain offsets may be utilized, and the frequency domain offsets are required to be configured to other BWPs at this time. Other BWPs may utilize the same frequency domain offset; may utilize the same frequency domain offset as the initial access BWP and different random access channel configuration information, and the random access channel configuration information is required to be configured to the other BWPs at this time. The other BWPs may utilize the same random access channel configuration information; or the other BWPs may utilize different random access channel configuration information and frequency domain offsets from the initial access BWP, and the BS configures with the higher layer signaling or physical downlink control channel.

2. The configurations of the random access channels on the other BWPs may be performed by terminal-specified signaling. For the other BWPs except for the initial access BWP, the random access configuration information as same as that on the initial access BWP is utilized, and the index or index group of the BWP available for the random access is indicated in the terminal-specified signaling. This signaling may be a higher layer signaling, or may also be a physical layer signaling, such as a downlink control information in a downlink control channel.

The terminal acquires the index or index group of the BWP available for the random access via the higher layer signaling or physical layer signaling, and determines the time-frequency resources of the random access channel in the BWP available for the random access according to the random access configuration information transmitted in the RMSI.

Particularly, the resources in time domain of the random access channel may be acquired via the random access channel configuration; and the frequency domain offset of the random access channel may be understood as an offset of the start PRB with respect to the BWP available for the random access.

3. The configurations for the random access channels on other BWPs are performed by the terminal-specified signaling. The BS configures the index or index group of the BWPs available for the random access, and configures the frequency domain offsets of the random access channels for the BWPs available for the random access channels. The frequency domain offsets may be uniform for all of the BWPs available for the random access channels, that is, the same frequency domain offset is utilized; alternatively, different frequency domain offsets are configured for respective BWPs.

In a case of uniform frequency domain offset, a corresponding signaling is $\{B_1, \ldots, B_K\} f_{RA}$, wherein $\{B_1, \ldots, B_K\}$ is the index group of the BWPs available for the random access, $f_{RA}$ is the frequency domain offset, namely the frequency domain offset with respect to the BWP of the start PRB.

In a case of separately configured frequency domain offset, a corresponding signaling is:

$\{B_1, \ldots, B_K\}, \{f_{RA1}, \ldots, f_{RAK}\}$, wherein $\{f_{RA1}, \ldots, f_{RAK}\}$ is the frequency domain offsets for the respective BWPs of the random access channels.

The random access channel configuration information for other BWPs utilizes the random access channel configuration information of the initial access BWP.

4. The configurations of the random access channels on the other BWPs are performed by the terminal-specified signaling. The BS configures the index or index group of the BWPs available for the random access, and configures the random access channel configurations for the BWPs available for the random access channels. The other BWPs available for the random access utilize the frequency domain offset configuration as same as the initial access BWP.

5. The configurations of the random access channels on the other BWPs are performed by the terminal-specified signaling. The BS configures the index or index group of the BWPs available for the random access, and configures the random access channel configurations and the frequency domain offsets for the BWPs available for the random access channels.

If the terminal has been configured to transmit the data through the BWP except for the initial access BWP by the BS and needs to the random access, the time-frequency resources of the random access channel and the preamble sequences are selected according to the random access configuration information on the BWP, and the preamble sequences selected or configured by the BS are transmitted in the random access channel on the BWP.

If the configured BWP has no random access configuration information, the terminal needs to initiate a BWP handover process so as to handover to an initial access bandwidth or a BWP in the random access channel, to perform the random access process.

If the random access process is triggered by the BS (for example, a random access process triggered by the downlink control channel) and the BWP currently configured for the terminal has no random access channel, the BS schedules the terminal to the initial access BWP or the BWP in the random access channel at first, and next triggers the random access process.

Figure 15:
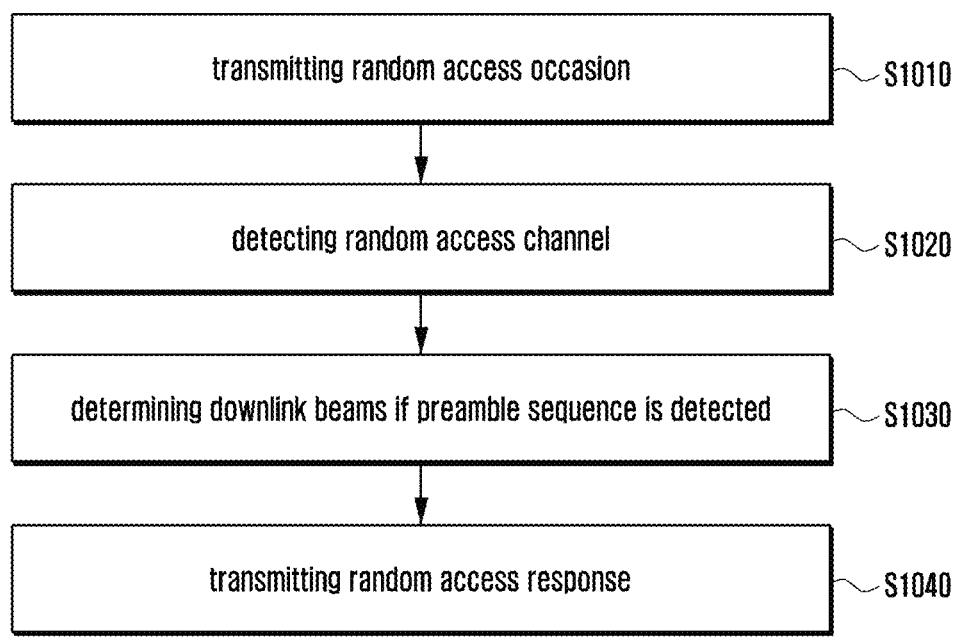
FIG. 15 is an exemplary view illustrating a random access preamble sequence detection method at the base station side according to the present disclosure.

FIG. 15 is an exemplary view illustrating a random access preamble sequence detection method at the base station side according to the present disclosure.

According to FIG. 15, the present disclosure provides a random access detection method as follows. At step S1010, transmitting synchronization signal blocks including a primary synchronization signal, a secondary synchronization signal and a broadcast channel. At step S1020, detecting respective random access occasions in a random access channel. At step S1030, determining downlink transmitting beams for transmitting a random access response according to time frequency resources of the random access occasions and/or the detected random access preamble sequences, if the transmission of the preamble sequences is detected. At step S1040, transmitting the random access response by the downlink transmitting beams determined at step S1030. FIG. 15 illustrates an action flowchart at the base station side. Wherein the detected preamble sequences detected at step S1030 are transmitted on the time frequency resources of the random access occasions determined by the terminal based on the method described in the above First to Third embodiments.

Figure 16:
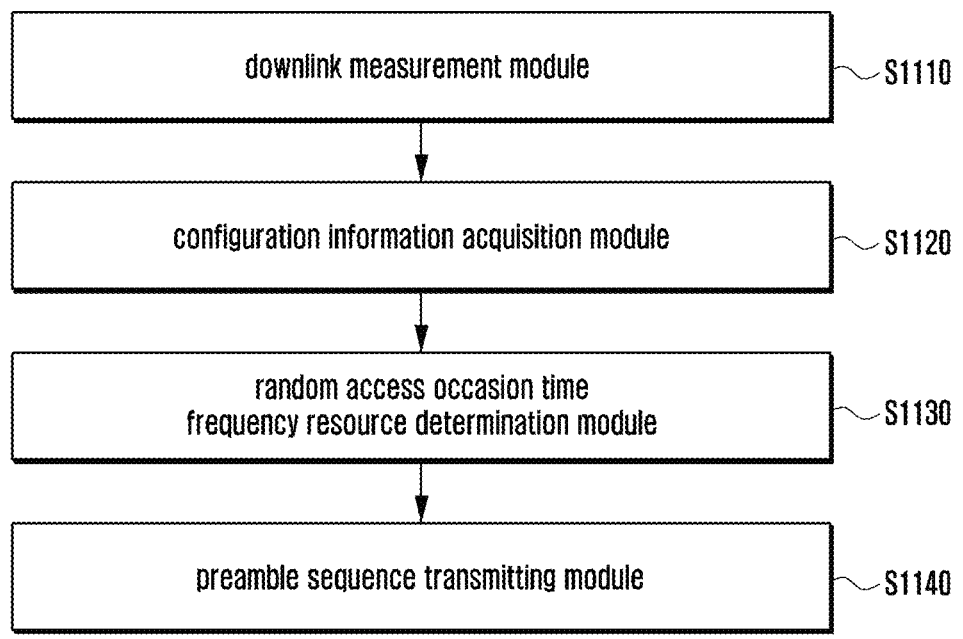
FIG. 16 illustrates a random access channel time frequency resource acquisition and determination apparatus included in the terminal according to the present disclosure.

FIG. 16 illustrates a random access channel time frequency resource acquiring and determination apparatus included in the terminal according to the present disclosure.

The present disclosure provides an apparatus for acquiring and determining time frequency resources of a random access channel, as illustrated in FIG. 16. The apparatus comprises: a downlink measurement module 1110 configured to determine synchronization signal blocks based on a downlink measure result; a configuration information acquisition module 1120 configured to read random access channel configuration information from the synchronization signal blocks; a random access occasion time frequency resource determination module 1130 configured to determine a time frequency resource position of the random access occasion according to the random access channel configuration and association information; a preamble sequence transmitting module 1140 configured to transmit the preamble sequence on the random access occasion. Wherein the random access occasion time frequency resource determination module 1130 determines the time frequency resource position of the random access occasion based on the method described in the above First to Third embodiments.

Figure 17:
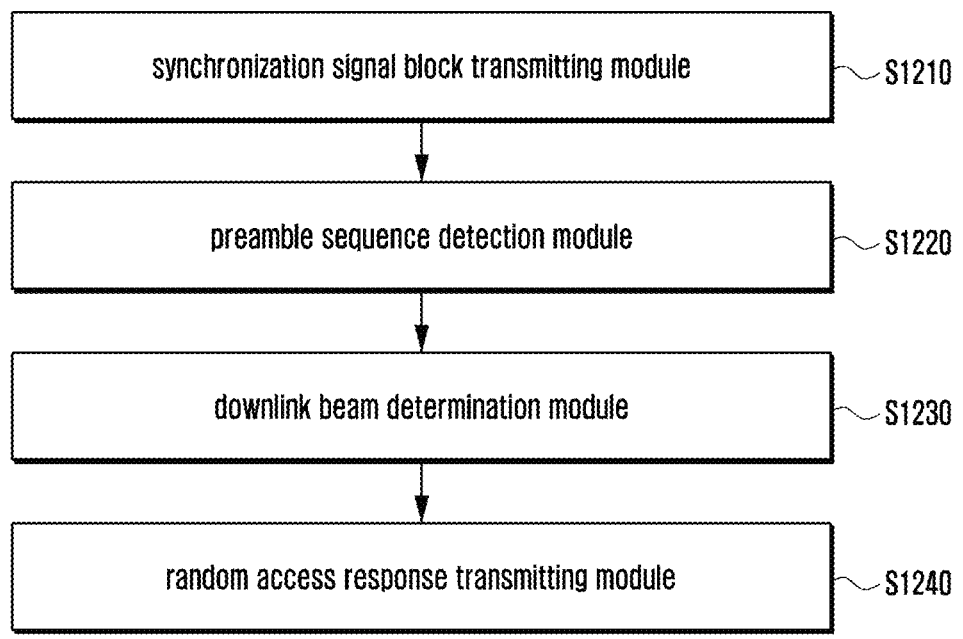
FIG. 17 illustrates a preamble sequence detection apparatus included in the base station according to the present disclosure.

FIG. 17 illustrates a preamble sequence detection apparatus included in the base station according to the present disclosure. The present disclosure provides a preamble sequence detection apparatus, as illustrated in FIG. 17, which comprises: a synchronization signal block transmitting module 1210 configured to transmit the synchronization signal blocks; a preamble sequence detection module 1220 configured to detect the preamble sequences on the respective random access occasions of the random access channel; a downlink beam determination module 1230 configured to determine downlink beams according to the time frequency resources of the random access occasions and the preamble sequences; a random access response transmitting module 1240 configured to transmit a random access response using the determined downlink beams. Wherein the preamble sequences detected in the preamble sequence detection module 1220 are transmitted on the time frequency resources of the random access occasion determined based on the method described in the above First to Third embodiments.

The present disclosure provides an acquisition and determination manner of time-frequency resource of the random access channel in a multi-beam operation system. With the methods provided by the present disclosure, the system can configure the time-frequency resources of the random access occasions corresponding to the different beams in a smaller signaling overhead. Further, the terminal can acquire the information on the random access occasion more quickly, so that the entire performance and operation efficiency of the system are improved.

In order to facilitate the understanding of the exemplary embodiments, some exemplary embodiments of the acquisition and determination manner of time-frequency resource of the random access channel in the multi-beam operation system according to the present disclosure have been described and illustrated in drawings. However, the above are only exemplary embodiments of the disclosed solution, but the scope sought for protection is not limited thereto. Instead, any or all modifications or replacements as would be obvious to those skilled in the art are intended to be included within the scope of the present invention. Therefore, the scope of the present invention is defined in the appended claims.

What is claimed is:

1. A method performed by a terminal in a wireless communication system, the method comprising:
   receiving, from a base station, at least one synchronization signal block (SSB);
   receiving, from the base station, configuration information including information on a number of SSBs associated with one random access channel (RACH) occasion;
   identifying an RACH occasion corresponding to an SSB of the at least one SSB based on the configuration information; and
   transmitting a random access preamble based on the RACH occasion,
   wherein N SSBs are mapped to the one RACH occasion based on a frequency resource of at least one RACH occasion and a time resource of the at least one RACH occasion, the N indicating the number of SSBs, and
   wherein the frequency resource of the at least one RACH occasion is used before the time resource of the at least one RACH occasion for mapping of the N SSBs and the one RACH occasion.

2. The method of claim 1,
   wherein a periodicity of the RACH occasion is configured to one of 10 ms, 20 ms, 40 ms, 80 ms, and 160 ms, and
   wherein the SSB is identified from the at least one SSB based on a threshold.

3. The method of claim 1,
   wherein the configuration information includes information on the at least one RACH occasion, and
   wherein the random access preamble is obtained based on the configuration information.

4. A method performed by a base station in a wireless communication system, the method comprising:
   transmitting, to a terminal, at least one synchronization signal block (SSB);
   transmitting, to the terminal, configuration information including information on a number of SSBs associated with one random access channel (RACH) occasion; and
   receiving a random access preamble on an RACH occasion corresponding to an SSB of the at least one SSB,
   wherein N SSBs are mapped to the one RACH occasion based on a frequency resource of at least one RACH occasion and a time resource of the at least one RACH occasion, the N indicating the number of SSBs, and
   wherein the frequency resource of the at least one RACH occasion is used before the time resource of the at least one RACH occasion for mapping of the N SSBs and the one RACH occasion.

5. The method of claim 4,
wherein a periodicity of the RACH occasion is configured to one of 10 ms, 20 ms, 40 ms, 80 ms, and 160 ms, and
wherein the SSB is identified from the at least one SSB based on a threshold.

6. The method of claim 4,
wherein the configuration information includes information on the at least one RACH occasion, and
wherein the random access preamble is obtained based on the configuration information.

7. A terminal in a wireless communication system, the terminal comprising:
a transceiver; and
a controller coupled with the transceiver and configured to:
receive, from a base station, at least one synchronization signal block (SSB),
receive, from the base station, configuration information including information on a number of SSBs associated with one random access channel (RACH) occasion,
identify an RACH occasion corresponding to an SSB of the at least one SSB based on the configuration information, and
transmit a random access preamble based on the RACH occasion,
wherein N SSBs are mapped to the one RACH occasion based on a frequency resource of at least one RACH occasion and a time resource of the at least one RACH occasion, the N indicating the number of SSBs, and
wherein the frequency resource of the at least one RACH occasion is used before the time resource of the at least one RACH occasion for mapping of the N SSBs and the one RACH occasion.

8. The terminal of claim 7,
wherein a periodicity of the RACH occasion is configured to one of 10 ms, 20 ms, 40 ms, 80 ms, and 160 ms, and
wherein the SSB is identified from the at least one SSB based on a threshold.

9. The terminal of claim 7,
wherein the configuration information includes information on the at least one RACH occasion, and
wherein the random access preamble is obtained based on the configuration information.

10. A base station in a wireless communication system, the base station comprising:
a transceiver; and
a controller coupled with the transceiver and configured to:
transmit, to a terminal, at least one synchronization signal block (SSB),
transmit, to the terminal, configuration information including information on a number of SSBs associated with one random access channel (RACH) occasion, and
receive a random access preamble on an RACH occasion corresponding to an SSB of the at least one SSB,
wherein N SSBs are mapped to the one RACH occasion based on a frequency resource of at least one RACH occasion and a time resource of the at least one RACH occasion, the N indicating the number of SSBs, and
wherein the frequency resource of the at least one RACH occasion is used before the time resource of the at least one RACH occasion for mapping of the N SSBs and the one RACH occasion.

11. The base station of claim 10,
wherein a periodicity of the RACH occasion is configured to one of 10 ms, 20 ms, 40 ms, 80 ms, and 160 ms, and
wherein the SSB is identified from the at least one SSB based on a threshold.

12. The base station of claim 10,
wherein the configuration information includes information on the at least one RACH occasion, and
wherein the random access preamble is obtained based on the configuration information.

\* \* \* \* \*